US006761542B2

(12) United States Patent
Ojima et al.

(10) Patent No.: US 6,761,542 B2
(45) Date of Patent: Jul. 13, 2004

(54) MULTISHAFT ELECTRIC MOTOR AND POSITIVE-DISPLACEMENT PUMP COMBINED WITH SUCH MULTISHAFT ELECTRIC MOTOR

(75) Inventors: Yoshinori Ojima, Fujisawa (JP); Kozo Matake, Kawasaki (JP); Genichi Sato, Chigasaki (JP); Yasushi Hisabe, Kohza-gun (JP); Masami Nagayama, Fujisawa (JP); Katsuaki Usui, Kawasaki (JP); Hiroaki Ogamino, Kawasaki (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/195,454

(22) Filed: Jul. 16, 2002

(65) Prior Publication Data

US 2002/0172599 A1 Nov. 21, 2002

Related U.S. Application Data

(60) Continuation of application No. 09/732,739, filed on Dec. 11, 2000, now Pat. No. 6,447,271, which is a division of application No. 09/127,123, filed on Jul. 30, 1998, now Pat. No. 6,183,218, which is a division of application No. 08/425,872, filed on Apr. 20, 1995, now Pat. No. 5,814,913.

(30) Foreign Application Priority Data

| Apr. 21, 1994 | (JP) | ............................................. 6-082969 |
| Sep. 22, 1994 | (JP) | ............................................. 6-254693 |
| Mar. 15, 1995 | (JP) | ............................................. 7-083319 |

(51) Int. Cl.$^7$ ............................................. F04B 35/04
(52) U.S. Cl. .................................... 417/410.4; 417/326
(58) Field of Search .......................... 417/410.4, 410.5, 417/410.1, 423.1, 423.7, 326

(56) References Cited

U.S. PATENT DOCUMENTS

| 3,863,446 A | * | 2/1975 | Giwosky ...................... 60/388 |
| 4,530,862 A | * | 7/1985 | Kerzel .......................... 427/445 |
| 4,639,199 A | * | 1/1987 | Frings et al. .................. 418/3 |
| 4,728,869 A | * | 3/1988 | Johnson et al. ............. 388/811 |
| 4,940,398 A | * | 7/1990 | Berges et al. ............ 417/410.4 |
| 5,096,390 A | * | 3/1992 | Sevrain et al. .............. 417/420 |
| 5,118,251 A | * | 6/1992 | Saulgeot ...................... 415/90 |
| 5,218,204 A | * | 6/1993 | Houk et al. ................. 250/288 |
| 5,240,405 A | * | 8/1993 | Schubach et al. ............. 431/62 |
| 6,183,218 B1 | * | 2/2001 | Ojima et al. ............. 417/410.4 |

* cited by examiner

*Primary Examiner*—Charles G. Freay
(74) *Attorney, Agent, or Firm*—Oblon, Spivak, McClelland, Maier & Neustadt, P.C.

(57) ABSTRACT

A multishaft electric motor has a plurality of juxtaposed rotors having respective permanent magnets disposed therearound, and a plurality of sets of armature elements disposed fully circumferentially around the rotors, respectively, the permanent magnets of adjacent two of the rotors having a plurality of pairs of unlike magnetic poles for magnetically coupling the rotors through the armature elements between the permanent magnets. A positive-displacement vacuum pump includes a casing, a pair of pump rotors rotatably disposed in the casing in confronting relation to each other, and a two-shaft electric motor coupled to the pump rotors for rotating the pump rotors in opposite directions. The two-shaft electric motor may comprise a pair of juxtaposed rotors and a pair of sets of armature elements disposed fully circumferentially around the rotors, respectively.

4 Claims, 21 Drawing Sheets

F I G. 1 0 A
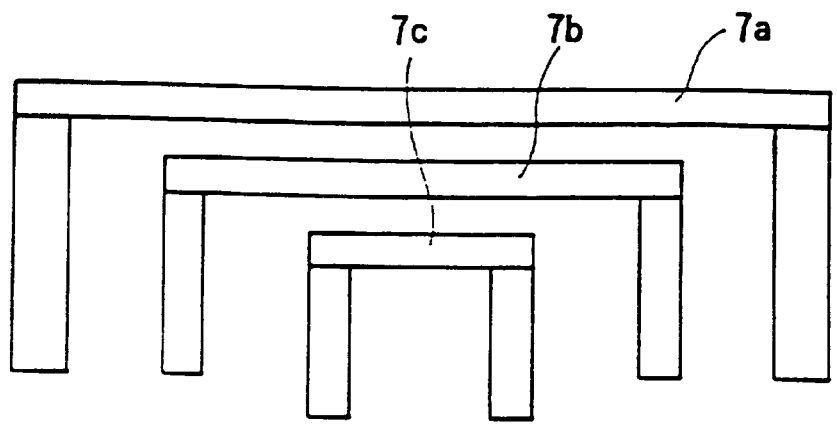
F I G. 1 0 B
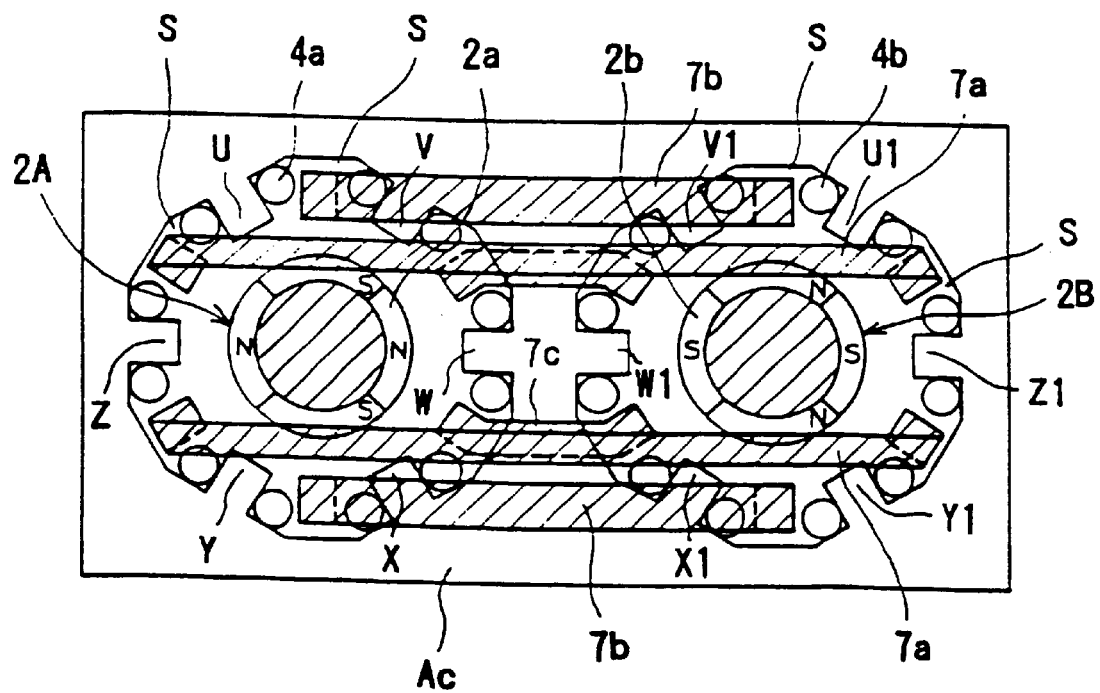

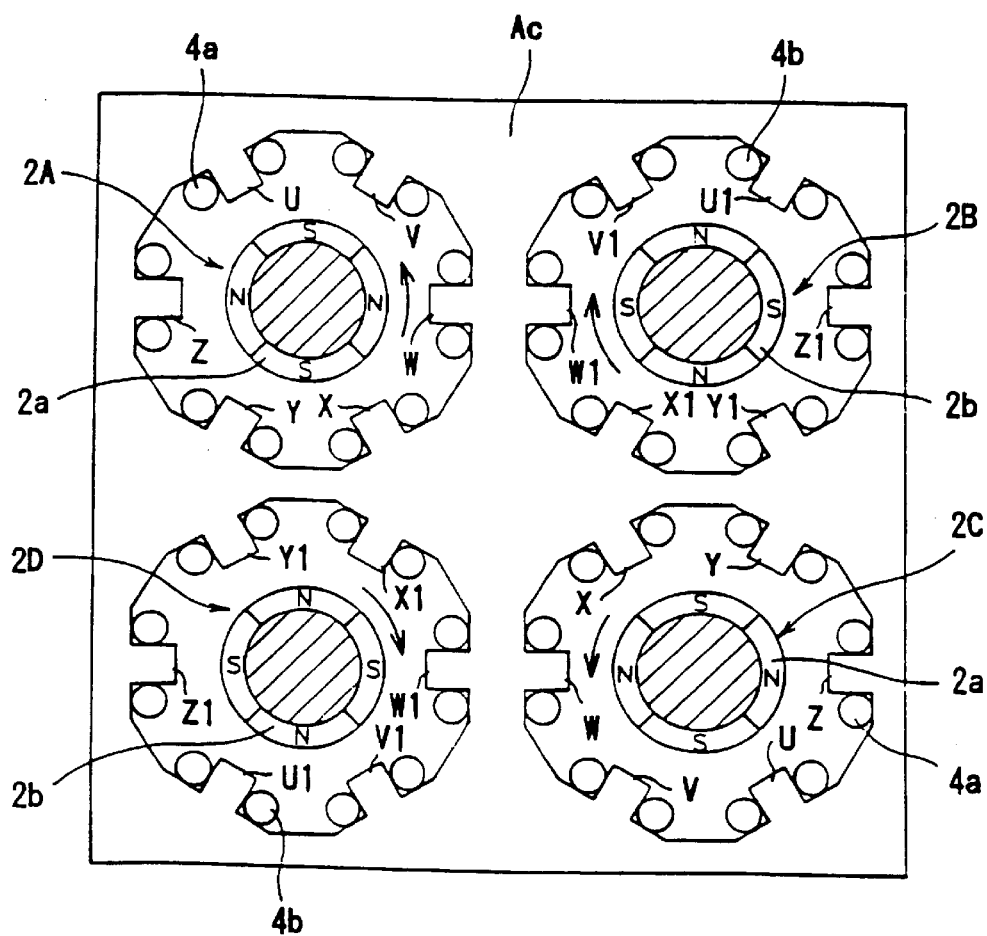
F I G. 14

F I G. 1 6
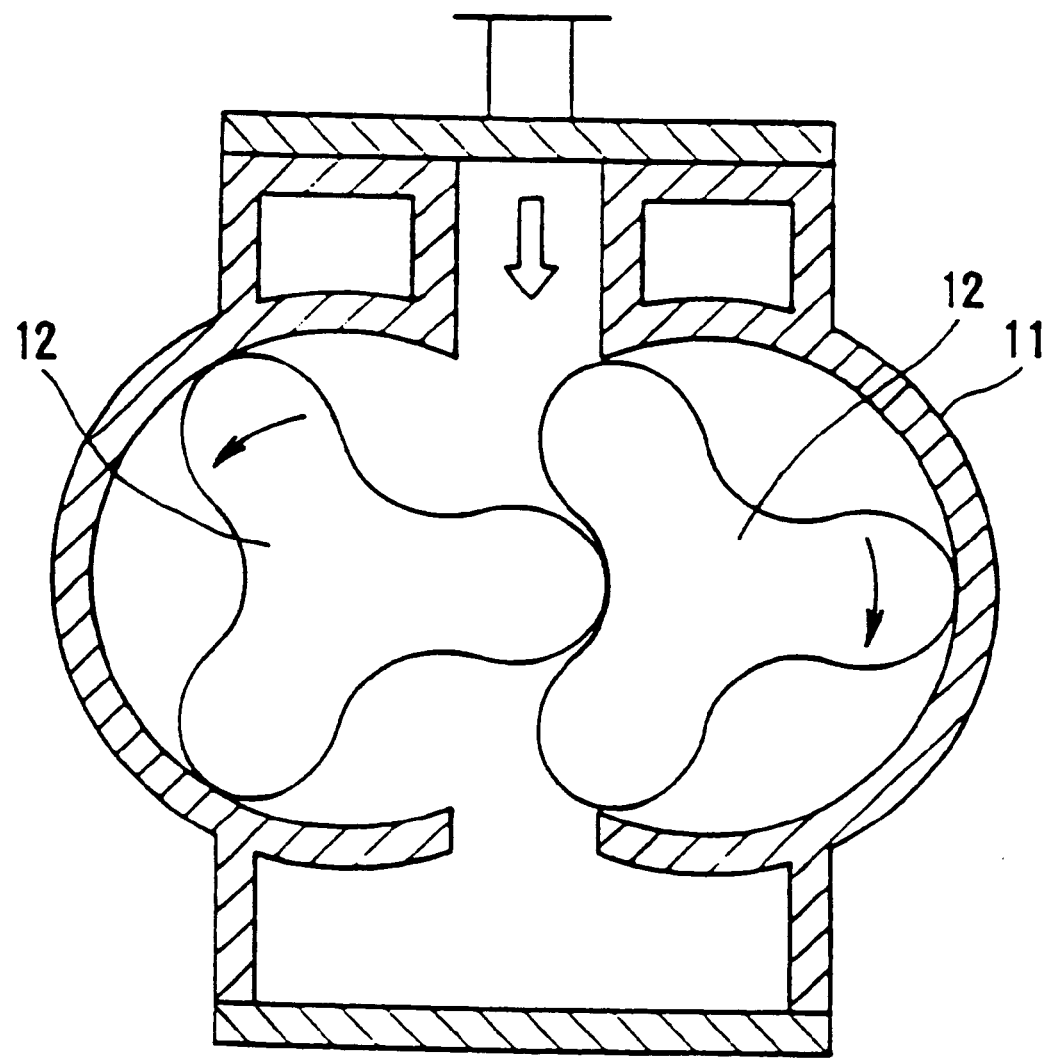

MULTISHAFT ELECTRIC MOTOR AND POSITIVE-DISPLACEMENT PUMP COMBINED WITH SUCH MULTISHAFT ELECTRIC MOTOR

BACKGROUND OF THE INVENTION

1. Field of the Invention

The present invention relates to a multishaft electric motor for rotating a plurality of shafts in synchronism with each other and a positive-displacement pump which is combined with such a multishaft electric motor, and more particularly to a multishaft electric motor suitable for use with a rotary machine which is required to rotate two shafts synchronously in opposite directions, such as a two-shaft gear pump, a two-shaft screw pump, a two-shaft Roots blower, a two-shaft screw compressor, or the like, and a positive-displacement pump which is combined with such a multishaft electric motor.

2. Description of the Prior Art

Electric motors for use as driving means for driving pumps or the like include induction motors and direct-current motors. Generally, these motors have only one rotatable shaft.

FIG. 23 of the accompanying drawings shows in cross section a two-shaft rotary machine such as a Roots blower which is driven by an electric motor having only one rotatable shaft. The two-shaft rotary machine shown in FIG. 23 comprises a pair of juxtaposed rotors 32, 33 disposed in a housing 31 and having respective shafts 32a, 33a, and a pair of gears 34, 35 fixedly mounted on the shafts 32a, 33a, respectively, and held in mesh with each other. An electric motor 35 has a rotatable drive shaft 35a coupled coaxially to the shaft 32a of the rotor 32.

When the rotor 32 is rotated by the electric motor 35, the rotational drive power is transmitted from the rotor 32 through the gears 34, 35 to the other rotor 33. Therefore, the shafts 32a, 33a and hence the rotors 32, 33 are rotated synchronously in opposite directions.

Japanese laid-open patent publication No. 4-178143 discloses a two-shaft electric motor for rotating two shafts synchronously in opposite directions. The disclosed two-shaft electric motor is shown in FIGS. 24 and 25 of the accompanying drawings. As shown in FIGS. 24 and 25, two rotors 41, 42 with circumferential permanent magnets are disposed in a housing 40 such that the permanent magnets are held in contact with each other or are positioned closely to each other. The rotors 41, 42 are juxtaposed in a stator 44 mounted in the housing 40 and supported on parallel shafts that are rotatably mounted in the housing 40 by respective sets of bearings 45, 46. An array of armature elements 43 is mounted on an elliptical inner circumferential surface of the stator 44. The rotors 41, 42 jointly provide a magnetic coupling in confronting tooth-free regions thereof where unlike magnetic poles of the permanent magnets of the rotors 41, 42 face each other.

The two-shaft rotary machine shown in FIG. 23 suffers size and noise problems because the gears 34, 35 are required as timing gears for rotating the rotors 32, 33 synchronously in opposite directions.

In the two-shaft electric motor shown in FIGS. 24 and 25, an attractive force is developed due to the magnetic coupling between the rotors 41, 42 which are supported in contact with each other or with a small gap left therebetween. The attractive force thus developed is responsible for a radially unbalanced load imposed on the rotors 41, 42. To suppress an excessively large eccentric load applied to the bearings 45, 46 owing to the radially unbalanced load and to allow the rotors 41, 42 to rotate smoothly at high speeds, it is necessary to apply a certain magnetic attractive counterforce tending to cancel the magnetic attractive force acting between the rotors 41, 42. The armature elements 43 disposed on the elliptical inner circumferential surface of the stator 44 are not available for generating such a magnetic attractive counterforce because the armature elements 43 generate a rotating magnetic field for driving the rotors 41, 42. If the rotors 41, 42 are held in contact with each other, then no such magnetic attractive counterforce needs to be generated, but the contacting rotors 41, 42 are liable to produce an undue level of wear or noise.

SUMMARY OF THE INVENTION

It is therefore an object of the present invention to provide a multishaft electric motor capable of rotating a plurality of shafts in synchronism with each other stably at high speeds.

Another object of the present invention is to provide a two-shaft electric motor capable of rotating two rotors synchronously in opposite directions stably at high speeds while eliminating a radially unbalanced load due to a magnetic coupling between the rotors.

Still another object of the present invention is to provide a positive-displacement vacuum pump which can be controlled to vary, i.e., increase or decrease, its rotational speed and to prevent an electric motor combined therewith from being overloaded, without employing other components including an inverter, a magnet coupling, a fluid coupling, and a speed-increasing gear.

To achieve the above objects, there is provided in accordance with the present invention a multishaft electric motor comprising a plurality of juxtaposed rotors having respective permanent magnets disposed therearound, and a plurality of sets of armature elements disposed fully circumferentially around the rotors, respectively, the permanent magnets of adjacent two of the rotors having a plurality of pairs of unlike magnetic poles for magnetically coupling the rotors through the armature elements between the permanent magnets.

According to the present invention, there is also provided a positive-displacement vacuum pump comprising a casing, a pair of pump rotors rotatably disposed in the casing in confronting relation to each other, and a two-shaft electric motor coupled to the pump rotors for rotating the pump rotors in opposite directions, the two-shaft electric motor comprising a pair of juxtaposed rotors having respective permanent magnets disposed therearound, and a pair of sets of armature elements disposed fully circumferentially around the rotors, respectively, the permanent magnets of the respective sets having a plurality of pairs of unlike magnetic poles for magnetically coupling the rotors through the armature elements between the permanent magnets.

In the multishaft electric motor, magnetic fluxes generated by the rotors pass through closed magnetic circuits extending between the rotors, and act as a magnetic coupling between the rotors. The magnetic circuits extend through a common armature core and are closed, and are balanced between the armature elements and the rotors. The magnetic circuits are able to produce rotational forces to rotate the rotors synchronously in opposite directions stably at high speeds without imposing an excessive eccentric load on bearings of the rotors.

In the positive-displacement vacuum pump, the pump rotors can be driven by the two-shaft electric motor, and the rotational speed of the pump can be varied by an external signal that is supplied to a motor driver for the two-shaft electric motor. Consequently, the displacement of the pump can be controlled by controlling the two-shaft electric motor. A current supplied to the two-shaft electric motor, typically a brushless direct-current motor, is monitored and controlled to vary the rotational speed thereof for preventing the positive-displacement vacuum pump from being overloaded. Accordingly, the positive-displacement vacuum pump is free of limitations on its operation range which would otherwise be required by variations in the load on a gas handled by the positive-displacement vacuum pump.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 10A and 10B are elevational and cross-sectional views, respectively, of a multishaft electric motor according to a fourth embodiment of the present invention;

FIG. 14 is a cross-sectional view of a multishaft electric motor according to a sixth embodiment of the present invention;

FIG. 16 is a cross-sectional view taken along line XVI—XVI of FIG. 15;

DETAILED DESCRIPTION OF THE PREFERRED EMBODIMENTS

Figure 1:
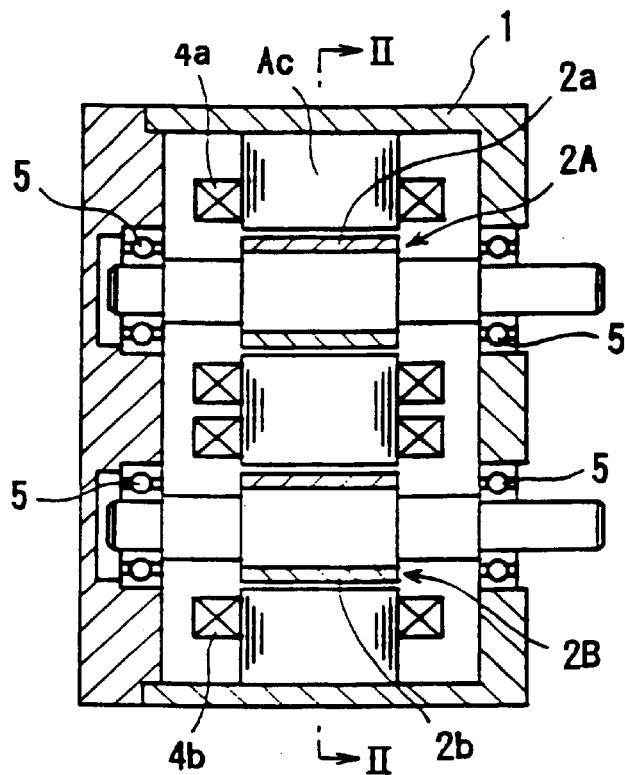
FIG. 1 is an axial cross-sectional view of a multishaft electric motor according to a first embodiment of the present invention.

Like or corresponding parts are denoted by like or corresponding reference characters throughout views.

A multishaft electric motor according to a first embodiment of the present invention will be described below with reference to FIGS. 1 through 5A, 5B and 5C.

Figure 2:
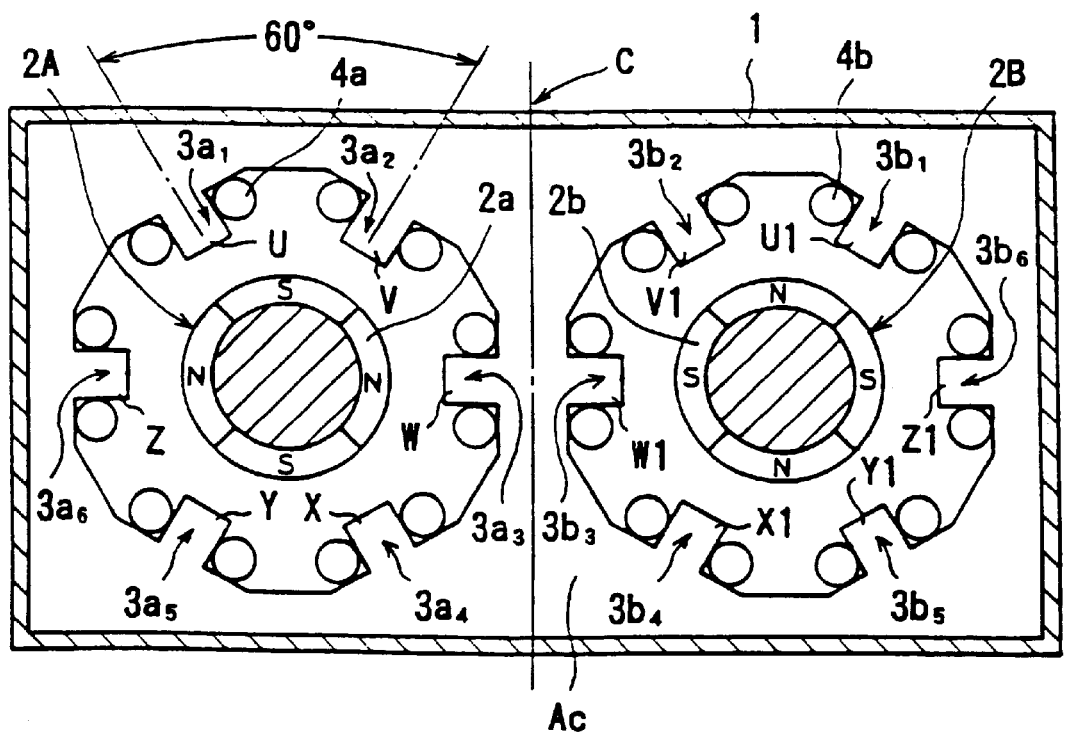
FIG. 2 is a cross-sectional view taken along line II—II of FIG. 1.

As shown in FIG. 1, the multishaft electric motor has a pair of rotors 2A, 2B disposed in a motor frame 1 and rotatably supported in the motor frame 1 by respective sets of bearings 5 near opposite ends of the shafts of the rotors 2A, 2B. As shown in FIG. 2, the rotors 2A, 2B have respective annular permanent magnets 2a, 2b disposed circumferentially around the rotor shafts each composed of 2n poles (n is the number of magnetic poles) arranged symmetrically at angularly equal intervals around the rotor shaft for generating radial magnetic fluxes. In the first embodiment, the permanent magnets 2a, 2b of each of the rotors 2A, 2B n=2 pole pairs and four poles S, N, S, N.

A plurality of armature elements $3a_1$–$3a_6$ are disposed at angularly equal intervals fully around the rotor 2A within the motor frame 1, and a plurality of armature elements $3b_1$–$3b_6$ are disposed at angularly equal intervals fully around the rotor 2B within the motor frame 1. An adjacent two of these armature elements $3a_1$–$3a_6$, $3b_1$–$3b_6$ are angularly spaced at a pitch of 60°. The armature elements $3a_1$–$3a_6$, $3b_1$–$3b_6$ comprise respective radially inwardly extending pole teeth U–Z, U1–Z1 on an armature core Ac and respective coils 4a, 4b mounted respectively on the pole teeth U–Z, U1–Z1. The pole teeth U–Z, U1–Z1 are positioned at circumferentially equal intervals, and the coils 4a, 4b are mounted on the respective pole teeth U–Z, U1–Z1 such that when the coils 4a, 4b are energized, the armature elements $3a_1$–$3a_6$, $3b_1$–$3b_6$ produce magnetic poles that are symmetric and opposite with respect to a central plane C lying intermediate between the respective axes of the rotors 2A, 2B. The coils 4b are wound in a direction opposite to the direction in which the coils 4a are wound.

Figure 3A:
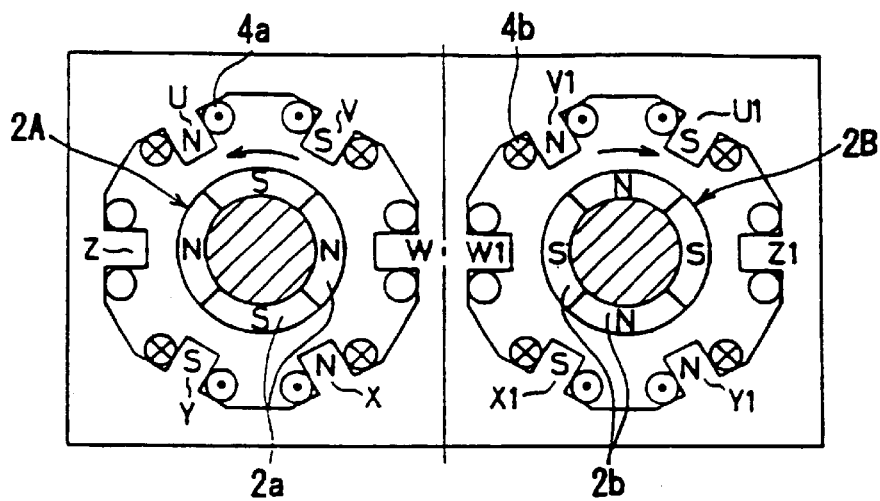
FIGS. 3A, 3B, and 3C are cross-sectional views showing the manner in which the multishaft electric motor shown in FIGS. 1 and 2 operates.
Figure 3B:
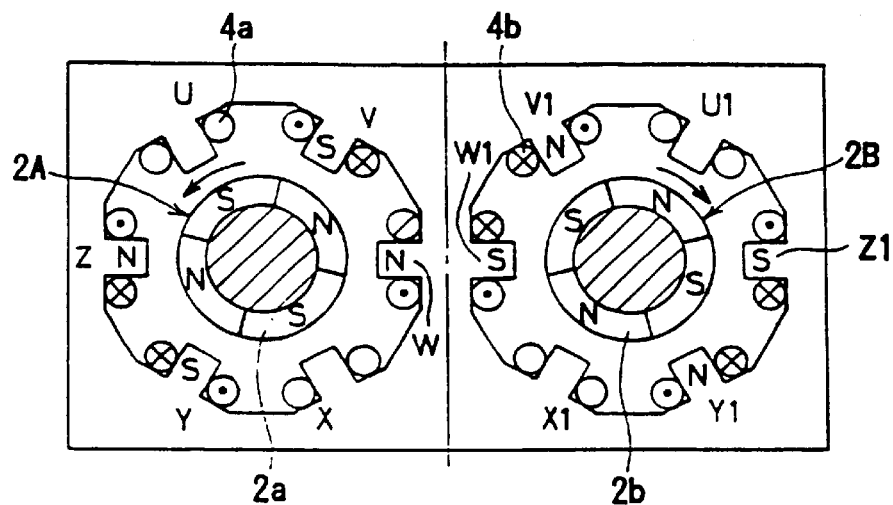
Figure 3C:
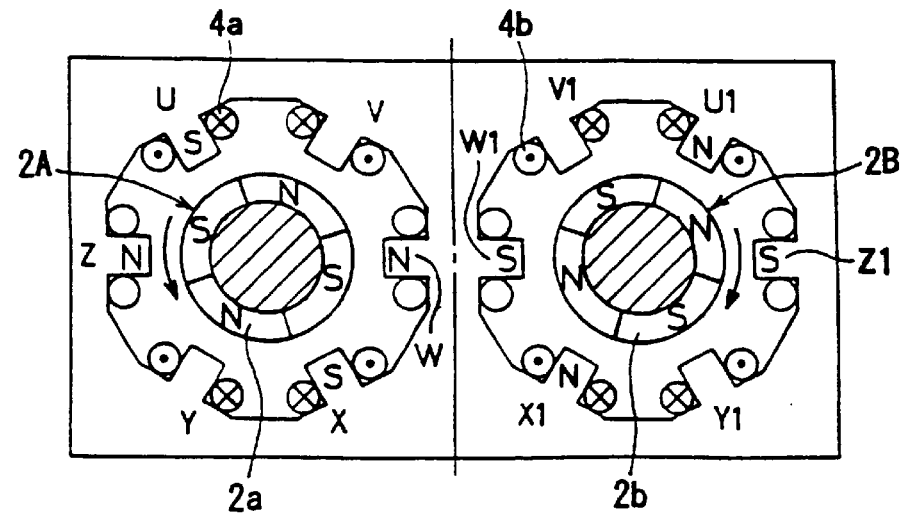

Operation of the multishaft electric motor shown in FIGS. 1 and 2 will be described below with reference to FIGS. 3A, 3B and 3C. In FIGS. 3A, 3B and 3C, only the rotors 2A, 2B and the armature elements $3a_1$–$3a_6$, $3b_1$–$3b_6$ are shown for illustrative purpose.

When the coils 4a, 4b are energized, the armature elements $3a_1$–$3a_6$, $3b_1$–$3b_6$ generate spatially moving magnetic fields for rotating the rotors 2A, 2B in opposite directions. Specifically, when the coils 4a, 4b are energized such that the pole teeth U, X produce N poles, the pole teeth V, Y produce S poles, the pole teeth U1, X1 produce S poles, and the pole teeth V1, Y1 produce N poles, all simultaneously, as shown in FIG. 3A, the rotors 2A, 2B are rotated in opposite directions as indicated by the arrows.

When the coils 4a, 4b are energized such that the pole teeth V, Y produce S poles, the pole teeth W, Z produce N poles, the pole teeth V1, Y1 produce N poles, and the pole teeth W1, Z1 produce S poles, all simultaneously, as shown in FIG. 3B, the rotors 2A, 2B are rotated in opposite directions as indicated by the arrows. Further, when the coils 4a, 4b are energized such that the pole teeth X, U produce S poles, the pole teeth W, Z produce N poles, the pole teeth X1, U1 produce N poles, and the pole teeth W1, Z1 produce S poles, all simultaneously, as shown in FIG. 3C, the rotors 2A, 2B are rotated under successive rotational forces in opposite directions as indicated by the arrows.

Magnetic fields generated by the permanent magnets 2a, 2b of the rotors 2A, 2B pass through magnetic paths that are formed and closed between the rotors 2A, 2B by the armature elements. Therefore, a magnetic coupling acts on the unlike magnetic poles of the rotors 2A, 2B for rotating the rotors 2A, 2B synchronously in opposite directions.

Figure 4:
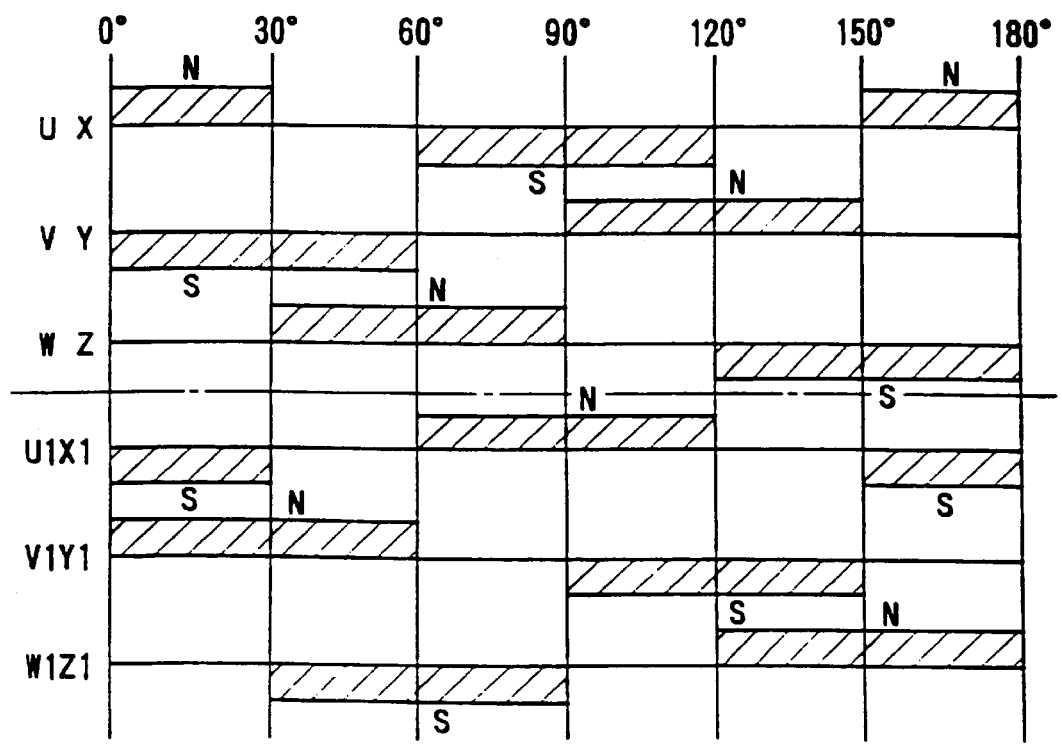
FIG. 4 is a timing chart of a current pattern in which coils are energized when the multishaft electric motor shown in FIGS. 1 and 2 operates as shown in FIGS. 3A through 3C.

FIG. 4 is a timing chart of a current pattern in which the coils 4a, 4b are energized when the multishaft electric motor shown in FIGS. 1 and 2 operates as shown in FIGS. 3A, 3B and 3C. Specifically, the pattern shown in FIG. 4 represents a pattern in which direct currents are supplied to the coils 4a on the pole teeth U–Z and direct currents are supplied to the coils 4b on the pole teeth U1–Z1. When the coils 4a, 4b are energized in the pattern shown in FIG. 4, a spatially moving magnetic field, i.e., a rotating magnetic field, is generated to magnetize the magnetic teeth U–Z, U1–Z1 as shown in FIGS. 3A, 3B and 3C, thus causing the rotors 2A, 2B to rotate synchronously in opposite directions, as described above. An electric circuit (not shown) for supplying the direct currents to the coils 4a, 4b in the pattern shown in FIG. 4 may be made up of existing electric components such as semiconductor devices or the like.

Figure 5A:
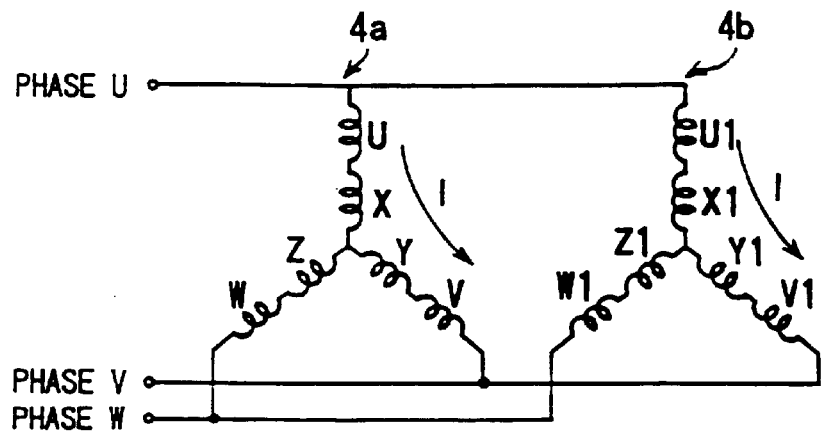
FIGS. 5A, 5B, and 5C are circuit diagrams showing how the coils are energized when the multishaft electric motor shown in FIGS. 1 and 2 operates as shown in FIGS. 3A through 3C.
Figure 5B:
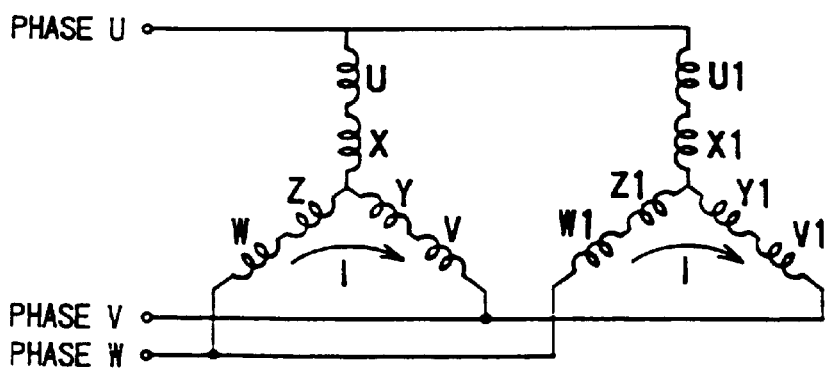
Figure 5C:
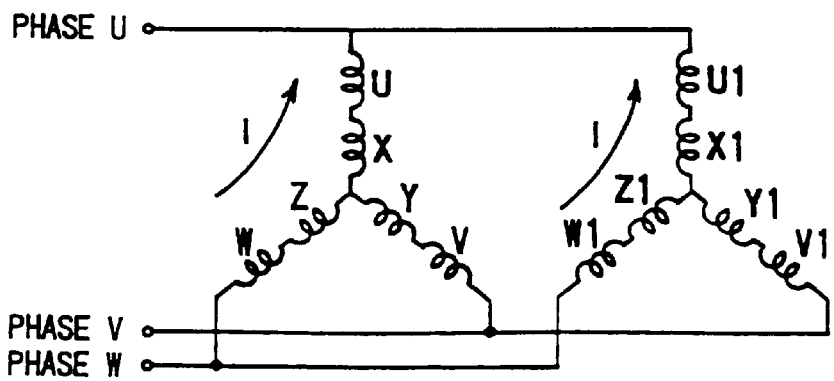

FIGS. 5A, 5B, and 5C show how the coils 4a, 4b are energized when the multishaft electric motor shown in FIGS. 1 and 2 operates as shown in FIGS. 3A, 3B and 3C. Specifically, FIG. 5A shows how the coils 4a, 4b are energized when the multishaft electric motor operates as shown in FIG. 3A, FIG. 5B shows how the coils 4a, 4b are energized when the multishaft electric motor operates as shown in FIG. 3B, and FIG. 5C shows how the coils 4a, 4b are energized when the multishaft electric motor operates as shown in FIG. 3C.

According to the first embodiment shown in FIGS. 1 through 5A, 5B and 5C, the rotors 2A, 2B with the annular permanent magnets 2a, 2b are juxtaposed and surrounded fully circumferentially by the armature elements $3a_1$–$3a_6$, $3b_1$–$3b_6$, and the permanent magnets 2a, 2b have plural pairs of unlike magnetic poles for providing a magnetic coupling between the rotors 2A, 2B through the armature elements. Therefore, the rotors 2A, 2B can be rotated synchronously in opposite directions by the magnetic coupling, and the bearings 5 are not subject to an excessive eccentric load, but a radially balanced load. Consequently, the rotors 2A, 2B and hence the respective two shafts of the electric motor can be rotated in synchronism with each other stably at high speeds, and the electric motor has a long service life.

Furthermore, since the magnetic coupling is provided between plural pairs of unlike magnetic poles of the permanent magnets 2a, 2b between the rotors 2A, 2B, the magnetic coupling has a large area. Large synchronizing forces free of pulsating forces are produced to rotate the rotors 2A, 2B synchronously because a uniform air gap length is achieved fully around the rotors 2A, 2B.

In addition, when the rotors 2A, 2B are driven, the coils 4a, 4b are energized such that symmetrically positioned armature elements produce unlike magnetic poles. Consequently, a high magnetic coupling effect is produced upon energization of the coils 4a, 4b in addition to the magnetic coupling effect that is present when the coils 4a, 4b are not energized.

Figure 6:
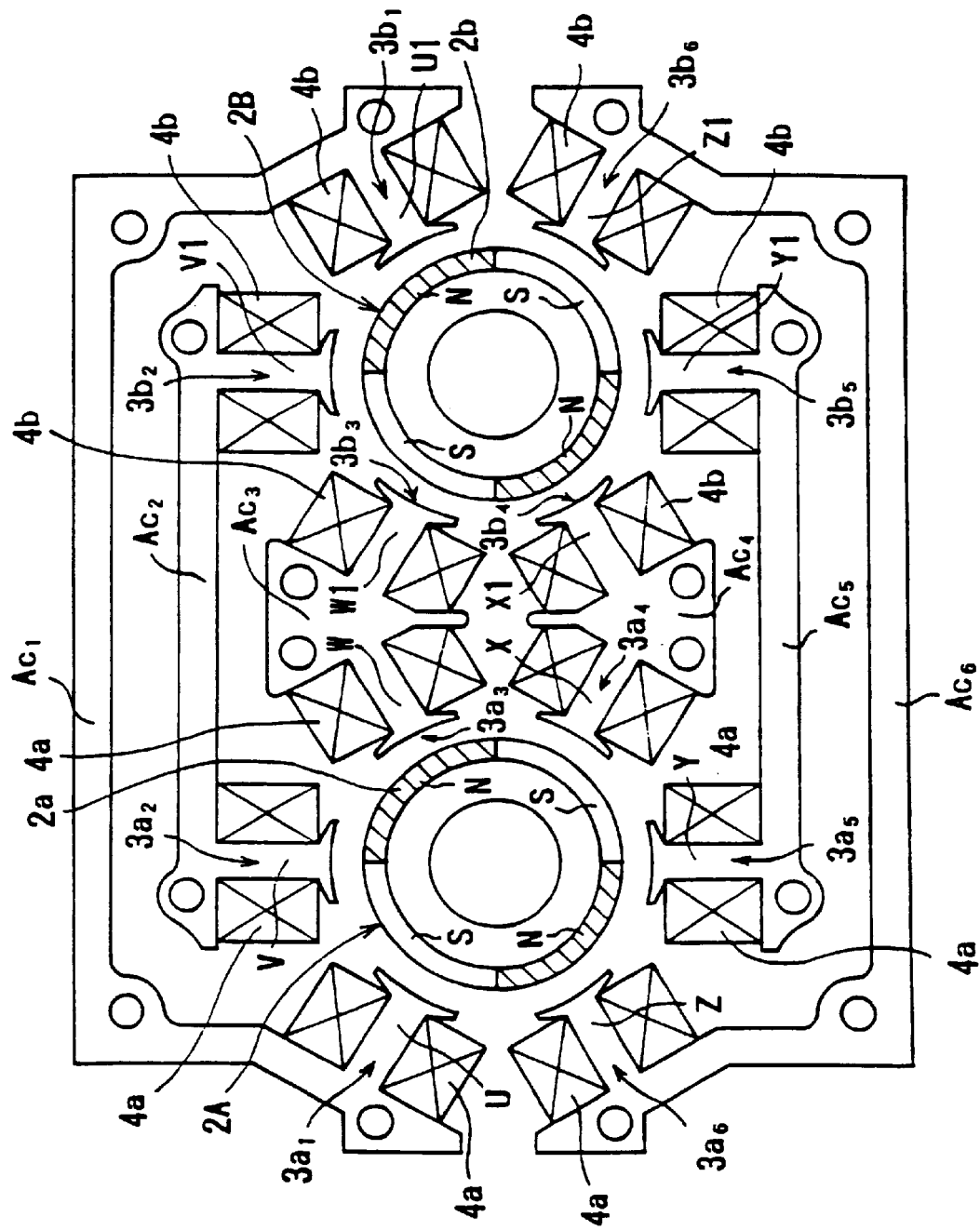
FIG. 6 is a cross-sectional view of a multishaft electric motor according to a second embodiment of the present invention.

FIG. 6 shows in cross section a multishaft electric motor according to a second embodiment of the present invention. According to the second embodiment, armature elements are divided into these of respective phases in order to couple unlike magnetic poles in symmetric positions of adjacent rotors. Specifically, as shown in FIG. 6, the multishaft motor has permanent magnets 2a on a rotor 2A and permanent magnets 2b on a rotor 2B which are arranged such that magnetic couplings are produced between unlike magnetic poles in symmetric positions thereof. The multishaft motor also has armature elements $3a_1$–$3a_6$, $3b_1$–$3b_6$ disposed fully circumferentially around the rotors 2A, 2B. The armature elements $3a_1$–$3a_6$, $3b_1$–$3b_6$ comprise respective radially inwardly extending pole teeth U–Z, U1–Z1 on armature cores $Ac_1$–$Ac_6$ and respective coils 4a, 4b mounted respectively on the pole teeth U–Z, U1–Z1. The armature elements $3a_1$–$3a_6$, $3b_1$–$3b_6$ are connected in respective phases only, e.g., the armature elements associated with phases U, U1 are connected to each other, the armature elements associated with phases V, V1 are connected to each other, the armature elements associated with phases W, W1 are connected to each other, the armature elements associated with phases X, X1 are connected to each other, the armature elements associated with phases Y, Y1 are connected to each other, and the armature elements associated with phases Z, Z1 are connected to each other.

With the above arrangement shown in FIG. 6, it is possible to magnetically couple the rotors 2A, 2B between unlike magnetic poles in symmetric positions thereof. Particularly, a high magnetic coupling effect is achieved when the coils 4a, 4b are not energized. When coils 4a, 4b are energized as shown in FIGS. 3A, 3B and 3C and 5A, 5B and 5C, the rotors 2A, 2B are rotated synchronously in opposite directions.

Figure 7:
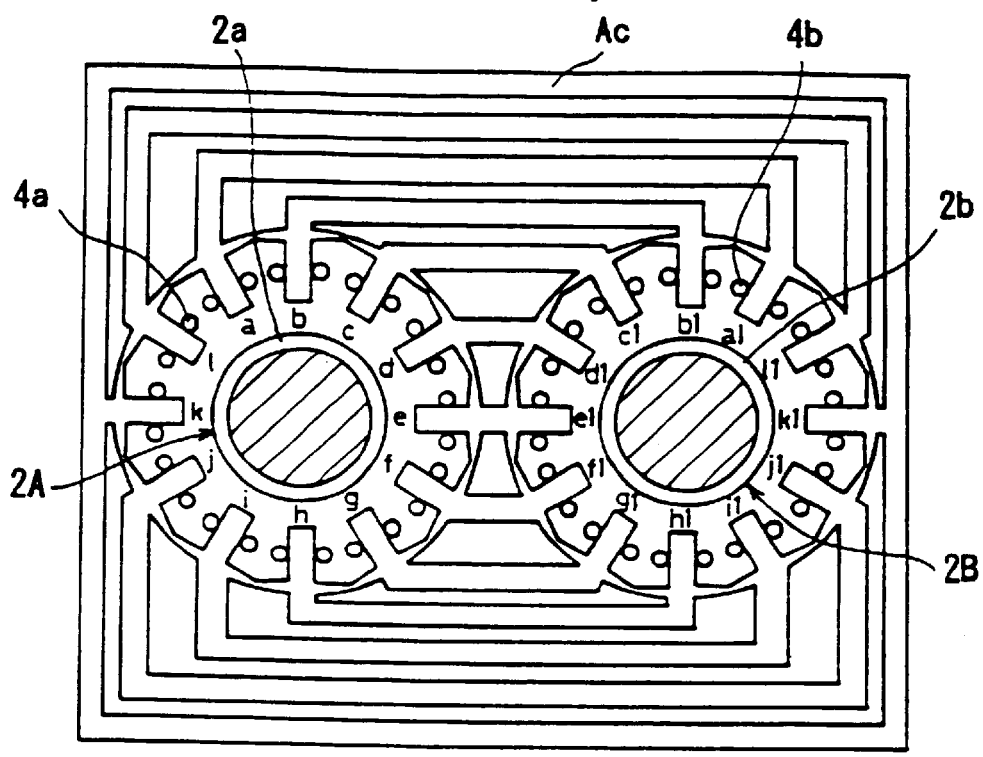
FIG. 7 is a cross-sectional view of a modification of the multishaft electric motor shown in FIG. 6.

FIG. 7 shows a modification of the multishaft electric motor shown in FIG. 6. According to the modification, rotors 2A, 2B with annular permanent magnets 2a, 2b are surrounded by armature elements having pole teeth "a"—"1", "a1"—"11" with coils 4a, 4b, the pole teeth "a"—"1", "a1"—"11" being connected in respective pairs to clearly define magnetic paths for the rotors 2A, 2B.

Figure 8:
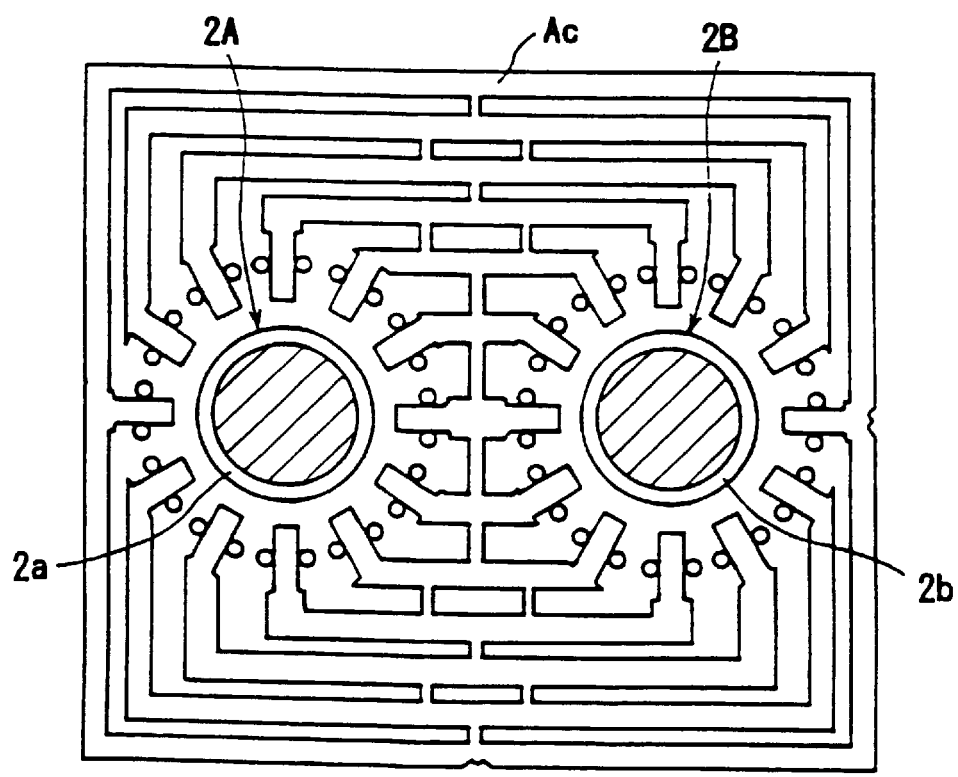
FIG. 8 is a cross-sectional view of another modification of the multishaft electric motor shown in FIG. 6.

FIG. 8 shows another modification of the multishaft electric motor shown in FIG. 6. In FIG. 8, pole teeth are connected in respective pairs to clearly define magnetic paths for rotors 2A, 2B with annular permanent magnets 2a, 2b.

If the modified multishaft electric motors shown in FIGS. 7 and 8 are arranged to provide a magnetic coupling effect in the absence of the coils 4a, 4b, then there is achieved a parallel magnetic coupling device capable of rotating the parallel rotors 2A, 2B synchronously in opposite directions.

Figure 9:
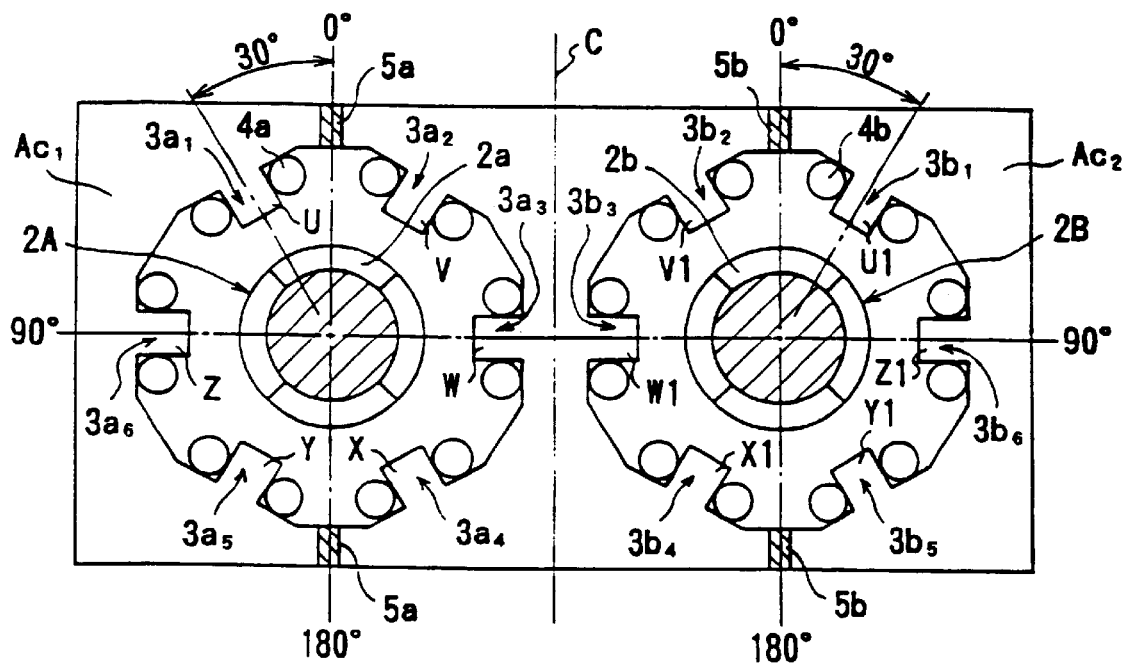
FIG. 9 is a cross-sectional view of a multishaft electric motor according to a third embodiment of the present invention.

FIG. 9 shows in cross section a multishaft electric motor according to a third embodiment of the present invention.

According to the third embodiment, an armature core is divided by air gaps to block those magnetic paths other than magnetic paths for coupling unlike magnetic poles in symmetric positions of adjacent rotors. Specifically, as shown in FIG. 9, the multishaft electric motor comprises a pair of rotors 2A, 2B with annular permanent magnets 2a, 2b mounted thereon, a plurality of armature elements $3a_1$–$3a_6$, $3b_1$–$3b_6$ disposed at angularly equal intervals fully circumferentially around the rotors 2A, 2B. An adjacent two of these armature elements $3a_1$–$3a_6$, $3b_1$–$3b_6$ are angularly spaced at a pitch of 60°. The armature elements $3a_1$–$3a_6$, $3b_1$–$3b_6$ comprise radially inwardly extending pole teeth U–Z on an armature core $Ac_1$, radially inwardly extending pole teeth U1–Z1 on an armature core $Ac_2$, and coils 4a, 4b mounted respectively on the pole teeth U–Z, U1–Z1. The pole teeth U–Z, U1–Z1 are positioned at circumferentially equal intervals, and the coils 4a, 4b are mounted on the respective pole teeth U–Z, U1–Z1 such that when the coils 4a, 4b are energized, the armature elements $3a_1$–$3a_6$, $3b_1$–$3b_6$ produce magnetic poles that are symmetric and opposite with respect to a central plane C lying intermediate between the respective axes of the rotors 2A, 2B. The coils 4b are wound in a direction opposite to the direction in which the coils 4a are wound.

The pole teeth U–Z on the armature core $Ac_1$ are divided into two equal groups of pole teeth U, Y, Z and V, X, W by upper and lower recesses 5a that are defined in the armature core $Ac_1$ along an alternate long and short dash line which extends perpendicularly to a line interconnecting the axes of the rotors 2A, 2B and passes through the axis of the rotor 2A. Similarly, the pole teeth U1–Z1 on the armature core $Ac_2$ are divided into two equal groups of pole teeth U1, Y1, Z1 and V1, X1, W1 by upper and lower recesses 5b that are defined in the armature core $Ac_2$ along an alternate long and short dash line which extends perpendicularly to the line interconnecting the axes of the rotors 2A, 2B and passes through the axis of the rotor 2B.

Other structural details of the multishaft electric motor shown in FIG. 9 are identical to those of the multishaft electric motor shown in FIGS. 1 and 2. When the coils 4a, 4b are energized as shown in FIGS. 3A, 3B and 3C and 5A, 5B and 5C, the rotors 2A, 2B are rotated synchronously in opposite directions. The recesses 5a, 5b are effective in increasing a magnetic coupling effect between the pole teeth V, V1 and also between the pole teeth X, X1, for thereby ensuring synchronous rotation of the rotors 2A, 2B in opposite directions.

A multishaft electric motor according to a fourth embodiment of the present invention is shown in FIGS. 10A and 10B. According to the fourth embodiment, magnetic coupling bars of a magnetic material extend between unlike magnetic poles of rotors. Specifically, as shown in FIG. 10A, the multishaft electric motor has a plurality of inverse U-shaped magnetic coupling bars 7a, 7b, 7c of a magnetic material. As shown in FIG. 10B, the multishaft electric motor also includes a pair of rotors 2A, 2B with annular permanent magnets 2a, 2b mounted thereon, a plurality of armature elements disposed at angularly equal intervals fully circumferentially around the rotors 2A, 2B. The armature elements comprise radially inwardly extending pole teeth U–Z, U1–Z1 on an armature core Ac, and coils 4a, 4b mounted respectively on the pole teeth U–Z, U1–Z1. The magnetic coupling bars 7a, 7b and 7c have legs inserted respectively in slots S defined in the armature core Ac between the pole teeth U–Z, U1–Z1, thereby providing closed magnetic paths between unlike magnetic poles of the rotors 2A, 2B. Certain air gaps are left between the armature core Ac and the magnetic coupling bars 7a, 7b and 7c. Magnetic fluxes passing through the slots S are magnetically coupled at the unlike magnetic poles of the rotors 2A, 2B for rotating the rotors 2A, 2B synchronously in opposite directions. The magnetic coupling bars 7a, 7b and 7c are effective in increasing a magnetic coupling effect when the coils 4a, 4b are not energized. Since the legs of the magnetic coupling bars 7a, 7b and 7c are inserted in the slots S which are symmetrically positioned between the two sets of armature elements, the legs of the magnetic coupling bars 7a, 7b and 7c can easily be inserted into the slots S. Therefore, the magnetic coupling bars 7a, 7b and 7c can easily be attached in place without magnetic interference with each other.

Figure 11:
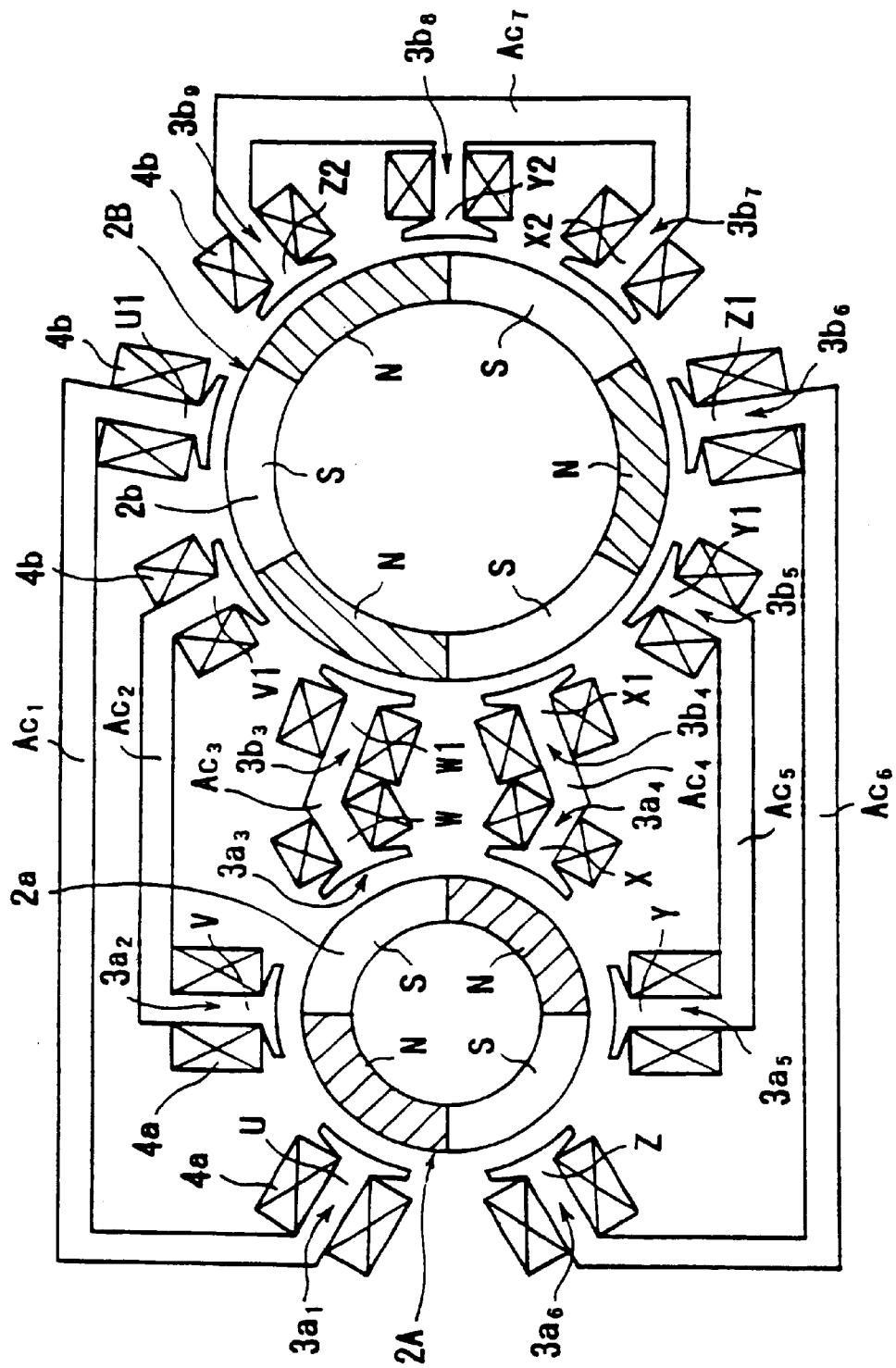
FIG. 11 is a cross-sectional view of a multishaft electric motor according to a fifth embodiment of the present invention.

FIG. 11 shows in cross section a multishaft electric motor according to a fifth embodiment of the present invention. According to the fifth embodiment, a pair of juxtaposed rotors 2A, 2B have different number of magnetic poles from each other so that the rotors 2A, 2B can be rotated in opposite directions at different rotational speeds from each other. That is, the rotors 2A and 2B are rotated at a ratio of rotational speeds in accordance with a ratio of the number of magnetic poles. As shown in FIG. 11, the rotor 2A has permanent magnets 2a comprising four poles S, N, S, N, and the rotor 2B has permanent magnets 2b comprising six poles S, N, S, N, S, N. Each of the permanent magnets 2a has the same outer circumferential length as each of the permanent magnets 2b. The ratio of the number of magnetic poles of the rotors A and B is 2:3.

A plurality of armature element $3a_1$–$3a_6$ are disposed at angularly equal intervals fully around the rotor 2A within the motor frame 1, and a plurality of armature elements $3b_1$–$3b_9$ are disposed at angularly equal intervals fully around the rotor 2B within the motor frame 1. The armature elements $3a_1$–$3a_6$ are angularly spaced at a pitch of 60° in the rotor 2A, and the armature elements $3b_1$–$3b_9$ are angularly spaced at a pitch of 40° in the rotor 2B. The armature elements $3a_1$–$3a_6$, $3b_1$–$3b_9$ comprise respective radially inwardly extending pole teeth U–Z, U1–Z1 and X2–Z2 on armature cores $Ac_1$–$Ac_7$ and respective coils 4a, 4b mounted respectively on the pole teeth U–Z, U1–Z1 and X2–Z2.

Figure 12:
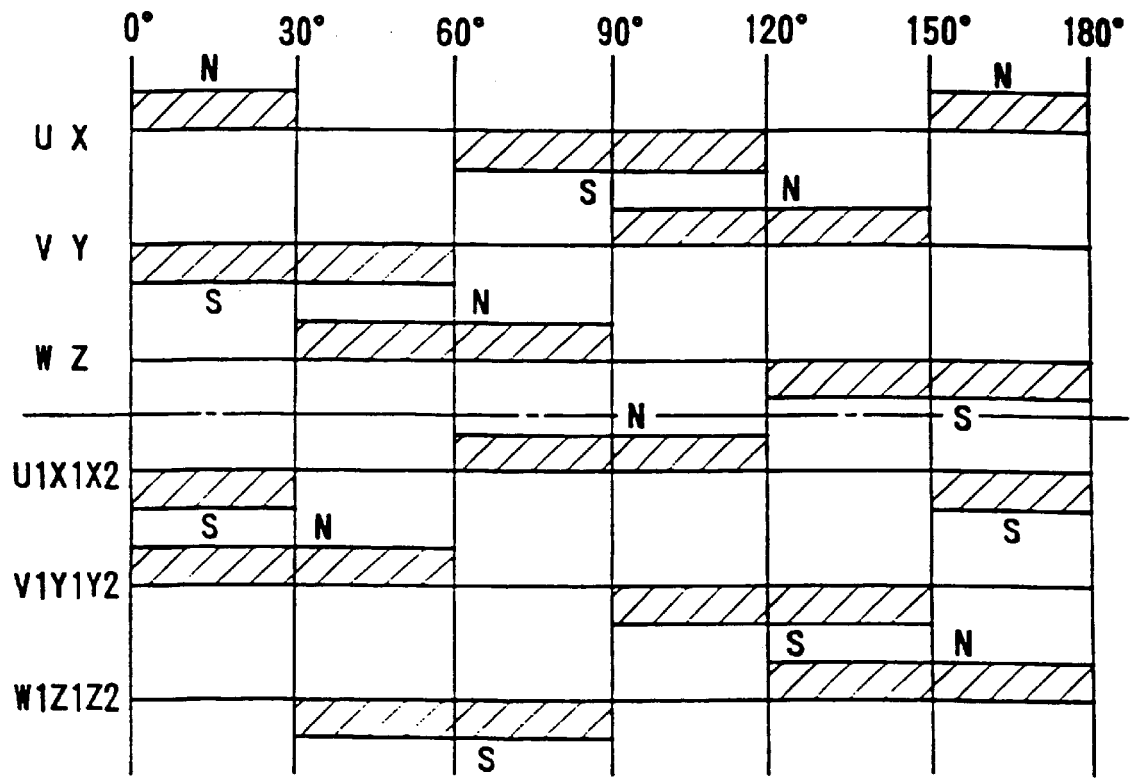
FIG. 12 is a timing chart of a current pattern in which coils are energized when the multishaft electric motor shown in FIG. 11 operates.
Figure 13A:
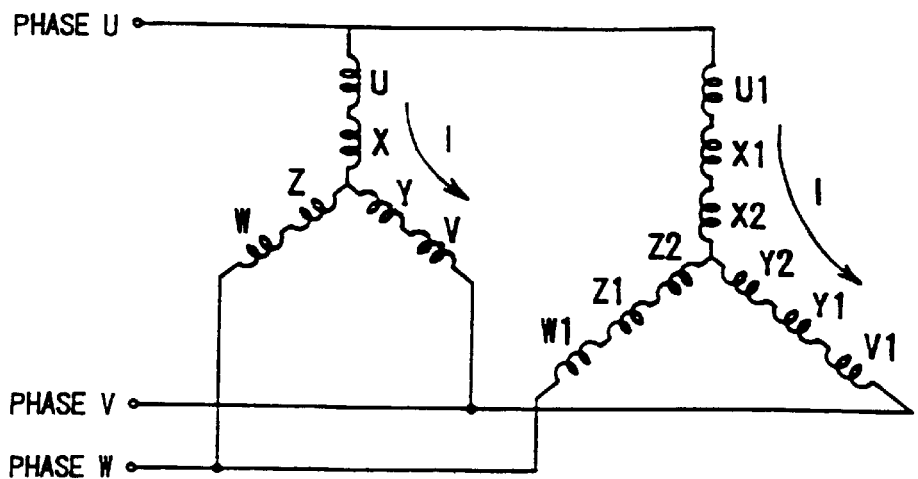
FIGS. 13A, 13B and 13C are circuit diagrams showing how the coils are energized when the multishaft electric motor shown in FIG. 11.
Figure 13B:
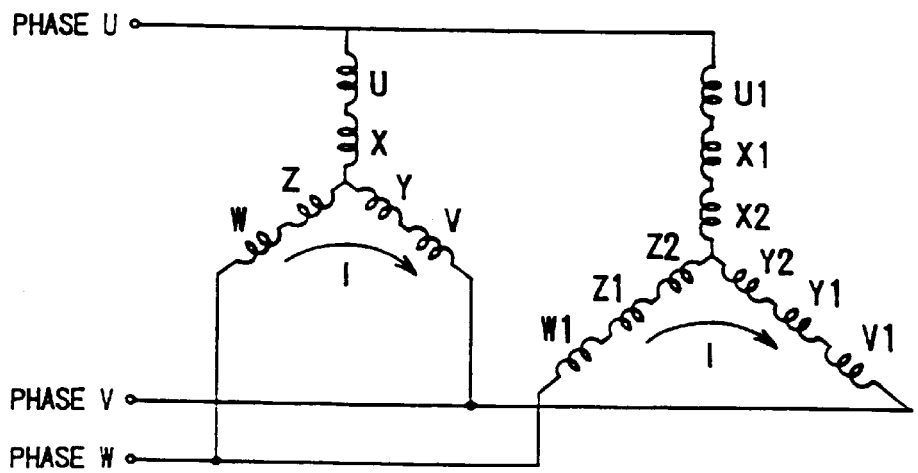
Figure 13C:
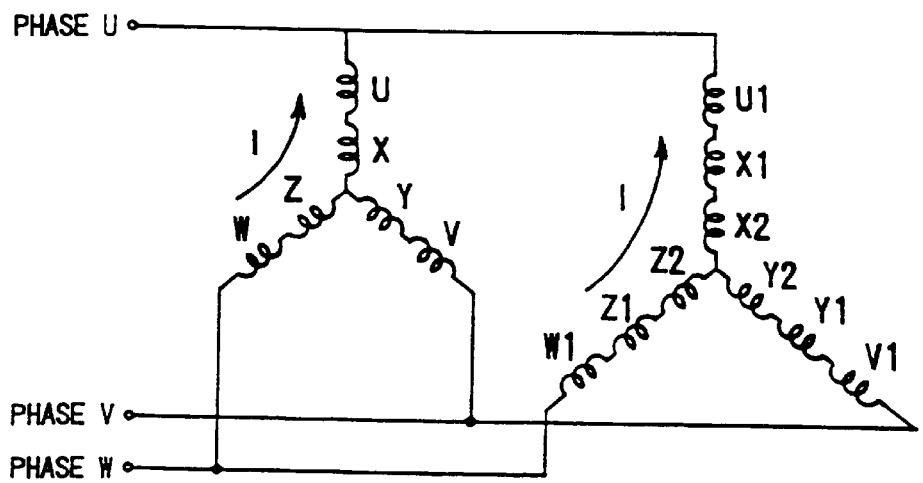

FIG. 12 is a timing chart of a current pattern in which the coils 4a, 4b are energized when the multishaft electric motor shown in FIG. 11 operates. FIGS. 13A, 13B and 13C are circuit diagrams showing how the coils 4a, 4b are energized when the multishaft electric motor shown in FIG. 11 operates. By supplying direct currents to the coils 4a and 4b as shown in FIGS. 12, 13A, 13B and 13C, a spatially moving magnetic field, i.e., a rotating magnetic field, is generated to magnetize the magnetic teeth U–Z, V1–Z1 and X2–Z2, thus causing the rotors 2A, 2B to rotate synchronously in opposite directions. In this case, the rotors 2A and 2B are rotated at a ratio of 3:2 which is in inverse proportion to a ratio of the number of magnetic poles, i.e., 2:3.

The multishaft electric motor in the fifth embodiment is preferably applicable to a screw compressor or the like in which a pair of pump rotors are rotated at a certain ratio of rotational speeds.

FIG. 14 shows in cross section a multishaft electric motor according to a sixth embodiment of the present invention. According to the sixth embodiment, the multishaft electric motor has four shafts. Specifically, the multishaft electric motor includes four rotors 2A, 2B, 2C, 2D that are magnetically coupled for synchronous rotation in opposite directions as indicated by the arrows. The multishaft electric motor according to the sixth embodiment may advantageously be used in combination with a stirrer or the like which requires three or more rotating shafts.

A positive-displacement vacuum pump according to an embodiment of the present invention which incorporates a multishaft electric motor according to the present invention will be described below with reference to FIGS. 15 through 21.

Figure 15:
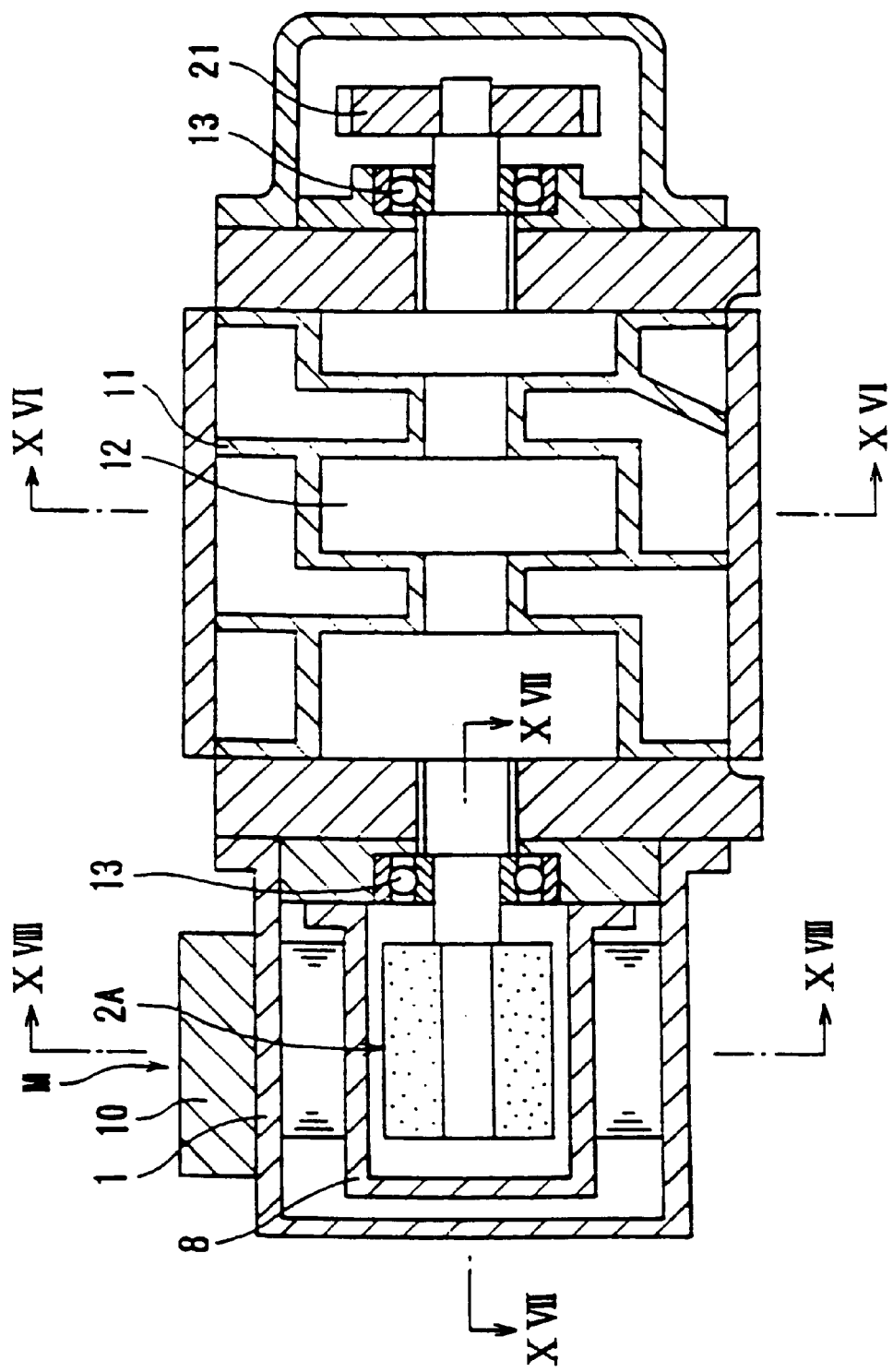
FIG. 15 is an axial cross-sectional view of a positive-displacement vacuum pump according to an embodiment of the present invention which incorporates a multishaft electric motor according to the present invention.

As shown in FIGS. 15 and 16, the positive-displacement vacuum pump has a casing 11 and a pair of Roots rotors 12 as pump rotors disposed in the casing 11. Each of the Roots rotors 12 is rotatably supported in the casing 11 by a pair of bearings 13 near opposite ends of the shaft thereof. The Roots rotors 12 can be rotated by a two-shaft electric motor M which is of a structure as shown in FIGS. 1 through 5A, 5B and 5C.

Figure 17:
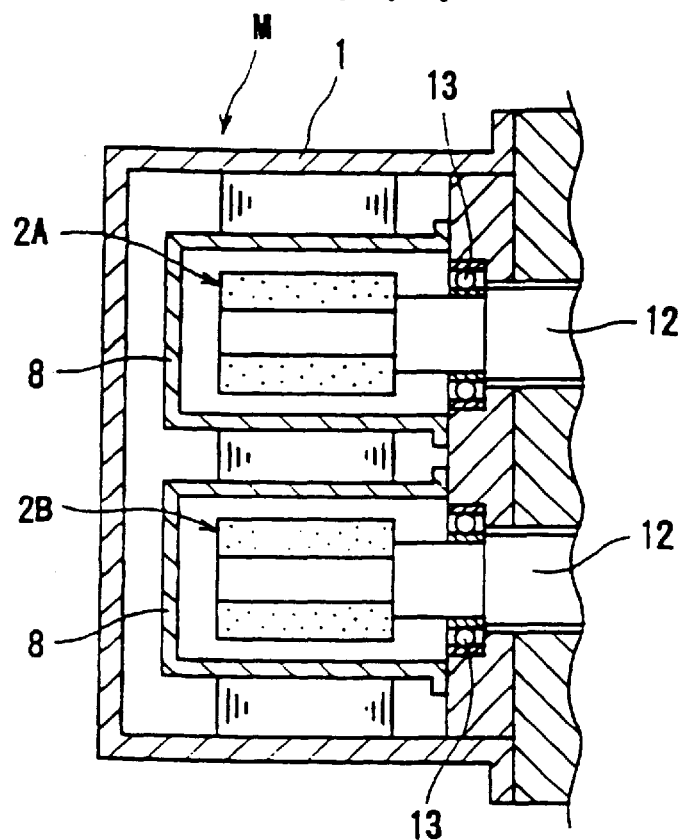
FIG. 17 is a cross-sectional view taken along line XVII—XVII of FIG. 15.
Figure 18:
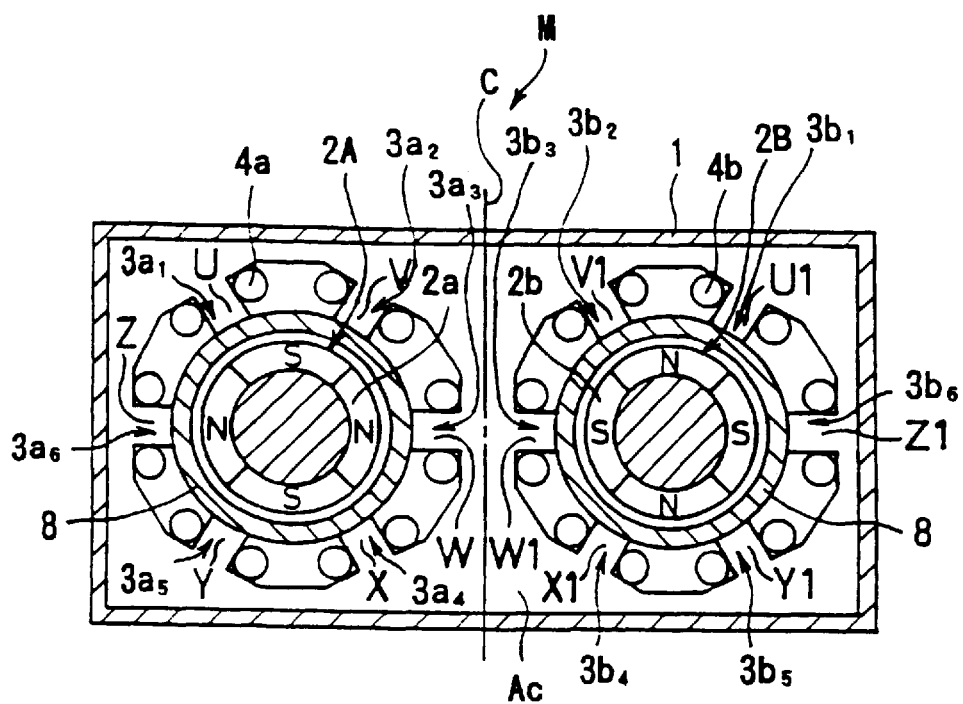
FIG. 18 is a cross-sectional view taken along line XVIII—XVIII of FIG. 15.

The two-shaft electric motor M is shown in detail in FIGS. 17 and 18. As shown in FIGS. 17 and 18, the two-shaft electric motor M has a pair of rotors 2A, 2B fixed coaxially to the ends of the respective shafts of the Roots rotors 12. The rotors 2A, 2B have respective annular permanent magnets, 2a, 2b disposed circumferentially around the rotor shafts each composed of $2n$ poles (n is the number of pole pairs) arranged symmetrically at angularly equal intervals around the rotor shaft for generating radial magnetic fluxes. In this embodiment, the permanent magnet 2a, 2b of each of the rotors 2A, 2B has n=2 pole pairs and four poles S, N, S, N.

A plurality of armature elements $3a_1$–$3a_6$ are disposed at angularly equal intervals fully around the rotor 2A within a motor frame 1 with a can 8 of synthetic resin interposed between the rotor 2A and the armature elements $3a_1$–$3a_6$, and a plurality of armature elements $3b_1$–$3b_6$ are disposed at angularly equal intervals fully around the rotor 2B within the motor frame 1 with a can 8 of synthetic resin interposed between the rotor 2A and the armature elements $3a_1$–$3a_6$. Adjacent two of these armature elements $3a_1$–$3a_6$, $3b_1$–$3b_6$ are angularly spaced at a pitch of 60°. The armature elements $3a_1$–$3a_6$, $3b_1$–$3b_6$ comprise respective radially inwardly extending pole teeth U–Z, U1–Z1 on an armature core Ac and respective coils 4a, 4b mounted respectively on the pole teeth U–Z, U1–Z1. The pole teeth U–Z, U1–Z1 are positioned at circumferentially equal intervals, and the coils 4a, 4b are mounted on the respective pole teeth U–Z, U1–Z1 such that when the coils 4a, 4b are energized, the armature elements $3a_1$–$3a_6$, $3b_1$–$3b_6$ produce magnetic poles that are symmetric and opposite with respect to a central plane C lying intermediate between the respective axes of the rotors 2A, 2B. The coils 4b are wound in a direction opposite to the direction in which the coils 4a are wound.

As shown in FIG. 15, a motor driver 10 for controlling operation of the two-shaft electric motor M is fixedly mounted on the motor frame 1.

Two intermeshing timing gears 21 (only one is shown in FIG. 15) are fixedly mounted respectively on the ends of the shafts of the Roots rotors 12 remote from the two-shaft electric motor M. The timing gears 21 serve to prevent the Roots rotors 12 from rotating out of synchronism with each other under accidental disturbant forces.

The positive-displacement vacuum pump operates as follows.

When the coils 4a, 4b of the two-shaft electric motor M are energized by the motor driver 10, the armature elements $3a_1$–$3a_6$, $3b_1$–$3b_6$ generate spatially moving magnetic fields for rotating the rotors 2A, 2B in opposite directions. The principles of rotation of the two-shaft electric motor M will not be described in detail here as they have been described above with reference to FIGS. 3A–3C through 5A–5C.

When the rotors 2A, 2B are rotated synchronously in opposite directions, the synchronized Roots rotors 12 rotate in opposite directions out of contact with each other, with a small clearance kept between the inner surfaces of the casing 11 and the Roots rotors 12 and also between the Roots rotors 12 themselves. As the Roots rotors 12 rotate, a gas which is drawn from an inlet port into the casing 11 as indicated by the arrow in FIG. 16 is confined between the Roots rotors 12 and the casing 11 and delivered toward an outlet port. In this embodiment, each of the Roots rotors 12 has three lobes and hence three recesses therebetween. Therefore, the gas is discharged from the positive-displacement vacuum pump six times per revolution of the positive-displacement vacuum pump.

In this embodiment, the two-shaft electric motor M comprises a two-shaft brushless direct-current motor, and the motor driver 10 has a function to control the two-shaft brushless direct-current motor to rotate selectively at variable rotational speeds and also a function to prevent the two-shaft brushless direct-current motor from being overloaded.

Figure 19:
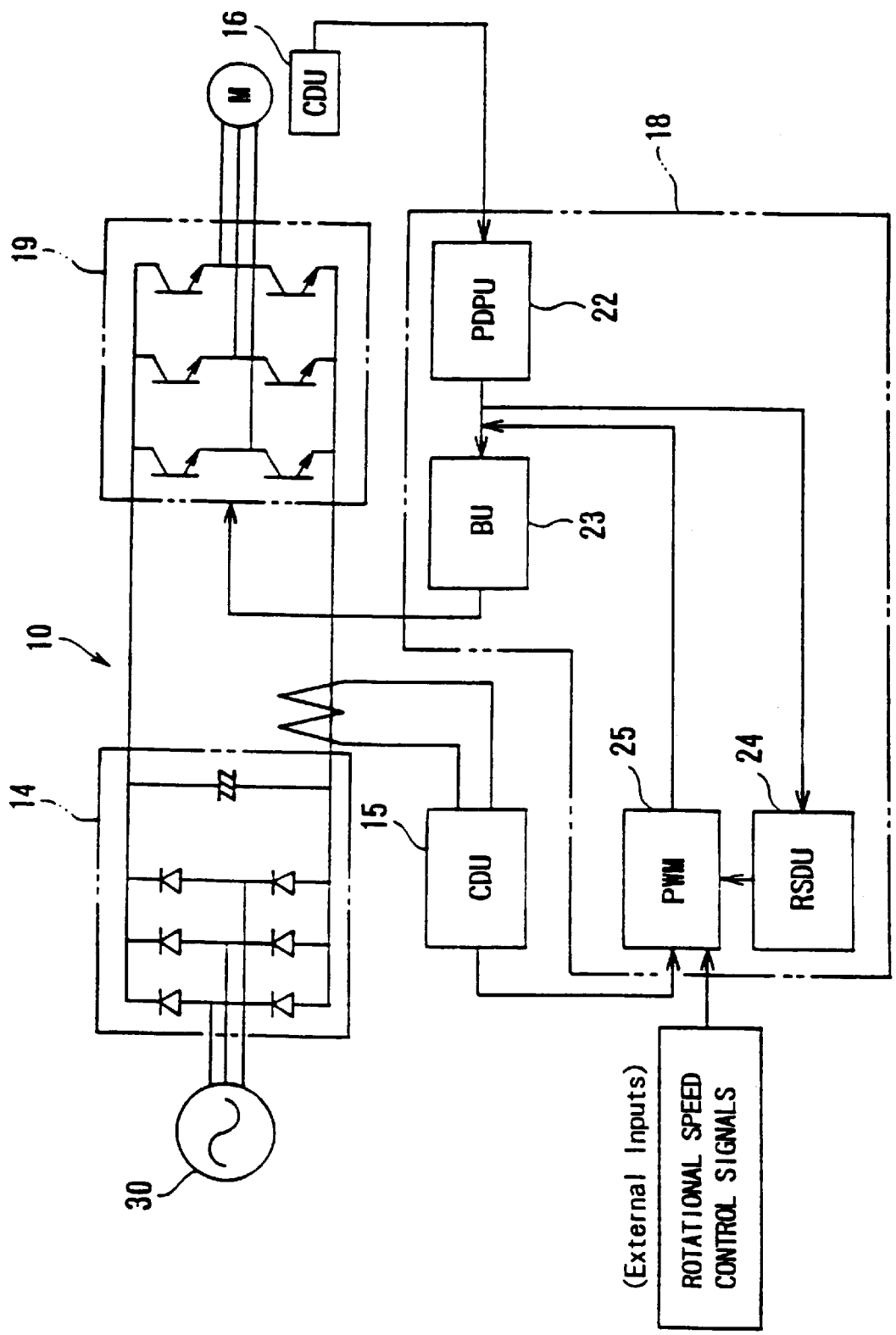
FIG. 19 is a block diagram of a motor driver of a two-shaft electric motor incorporated in the positive-displacement vacuum pump of FIG. 15.

FIG. 19 is a block diagram showing the structure of the motor driver 10. In the motor driver 10, alternate current (AC) from an AC power supply 30 is converted into direct current (DC) by a rectifying circuit 14, and current signals from a current detecting unit (CDU) 15, phase signals of the motor rotor and rotational speed signals of the motor rotor from a position detecting unit (PDU) 16, rotational speed control signals which are external inputs are inputted into a control unit 18, and thus driving signals are supplied from the control unit 18 to a driving circuit 19 which drives the brushless direct-current motor M. The control unit 18 comprises a position detecting signal processing unit (PDPU) 22, a base unit (BU) 23, a rotational speed detecting unit (RSDU) 24 and a PWM control unit (PWM) 25.

Figure 20:
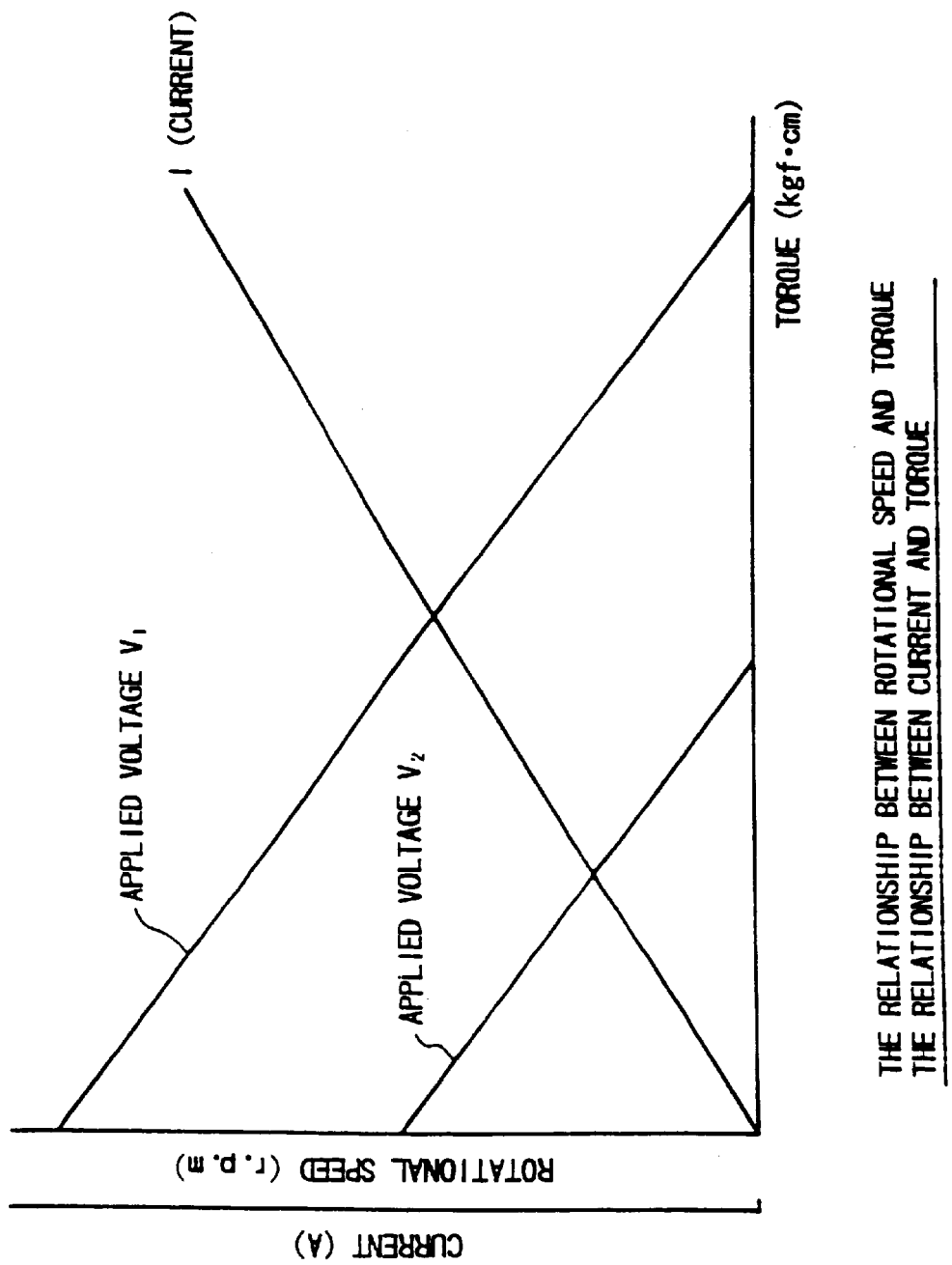
FIG. 20 is a diagram showing the relationship between the rotational speed and torque and the relationship between current and torque.

FIG. 20 shows a graph illustrative of the relationship between rotational speed and torque and the relationship between current and torque in the brushless direct-current motor M.

Figure 21:
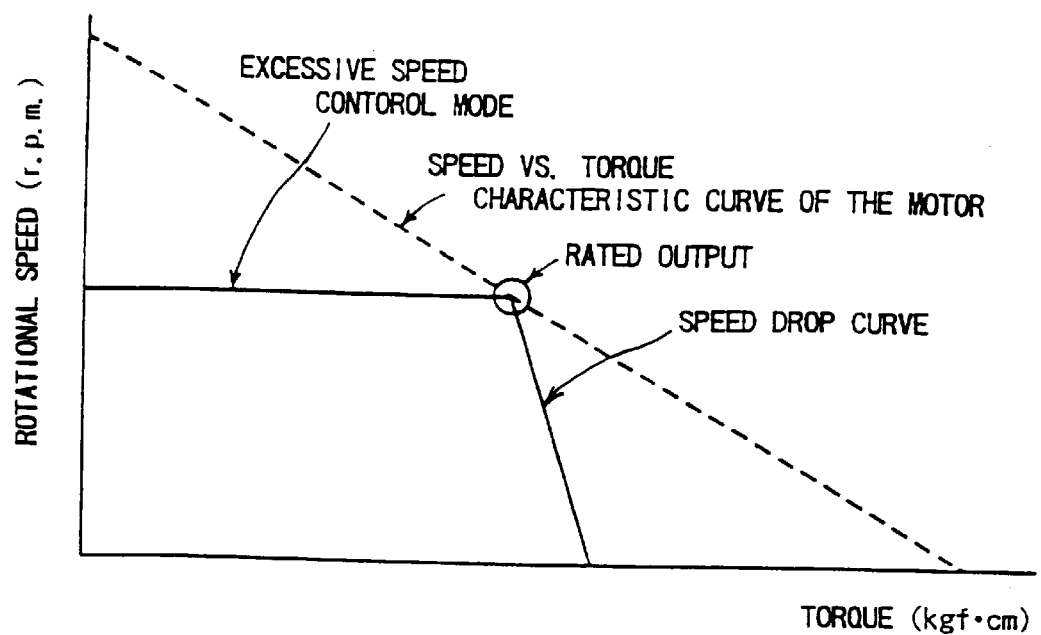
FIG. 21 is a diagram showing the relationship between motor characteristics and pump operation in the positive-displacement vacuum pump.

The brushless direct-current motor M has a linear speed vs. torque characteristic curve as indicated in FIG. 20 such that the rotational speed of the brushless direct-current motor M increases as the torque produced thereby decreases. FIG. 21 shows a graph illustrative of the relationship between motor characteristics and pump operation of the positive-displacement vacuum pump. In view of the service life of the bearings used, the brushless direct-current motor M is controlled so as to operate the positive-displacement vacuum pump at a certain constant rotational speed when the torque produced by the positive-displacement vacuum pump is equal to or lower than a rated torque (rated output) as shown in FIG. 21.

The torque and current of the brushless direct-current motor M are correlated to each other such that as the torque produced by the brushless direct-current motor M increases, the current supplied to the brushless direct-current motor M also increases as shown in FIG. 20. As the current supplied to the brushless direct-current motor M increases, the coils 4a, 4b are heated due to the Joule heat. To prevent the brushless direct-current motor M from suffering burnout by the heat caused by an overload, the motor driver 10 establishes a preset current value for the motor current. The motor current is monitored by the current detecting unit 15. When the motor current exceeds the preset current value, the motor driver 10 controls the motor current to lower the rotational speed of the positive-displacement vacuum pump as indicated by a speed drop curve in FIG. 21, thereby lowering the pump load to prevent the motor from being overloaded.

Further, as shown in FIG. 20, the rotational speed and applied voltage of the brushless direct-current motor M are correlated to each other such that as the applied voltage increases, the rotational speed of the motor M increases. In FIG. 20, the relationship between applied voltages $V_1$ and $V_2$ is $V_1>V_2$. Thus, the rotational speed of the motor M can be freely varied by varying applied voltages to the motor M. As shown in FIG. 19, by supplying rotational speed control signals from an external unit to the PWM control unit 25 of the control unit 18, applied voltages to the motor M can be controlled, resulting in controlling the rotational speed of the motor M.

Since the cans 8 are disposed as partitions between the rotors 2A, 2B and the armature elements $3a_1$–$3a_6$, $3b_1$–$3b_6$, the interior space of the positive-displacement vacuum pump is completely isolated from the exterior space. Accordingly, the positive-displacement vacuum pump has improved performance and is free of troubles which would otherwise be caused by ambient air entering the positive-displacement vacuum pump.

Furthermore, the brushless direct-current motor M allows a greater air gap to be created between the rotors 2A, 2B and the armature elements $3a_1$–$3a_6$, $3b_1$–$3b_6$ than induction motors. Heretofore, conventional electric motors combined with positive-displacement vacuum pumps employ metal cans which are liable to give rise to a large loss due to an eddy current. Since the cans 8 can be of greater thickness according to the illustrated embodiment, the cans 8 can be made of synthetic resin, and do not produce any eddy-current loss, resulting in an increase in the motor efficiency.

Figure 22:
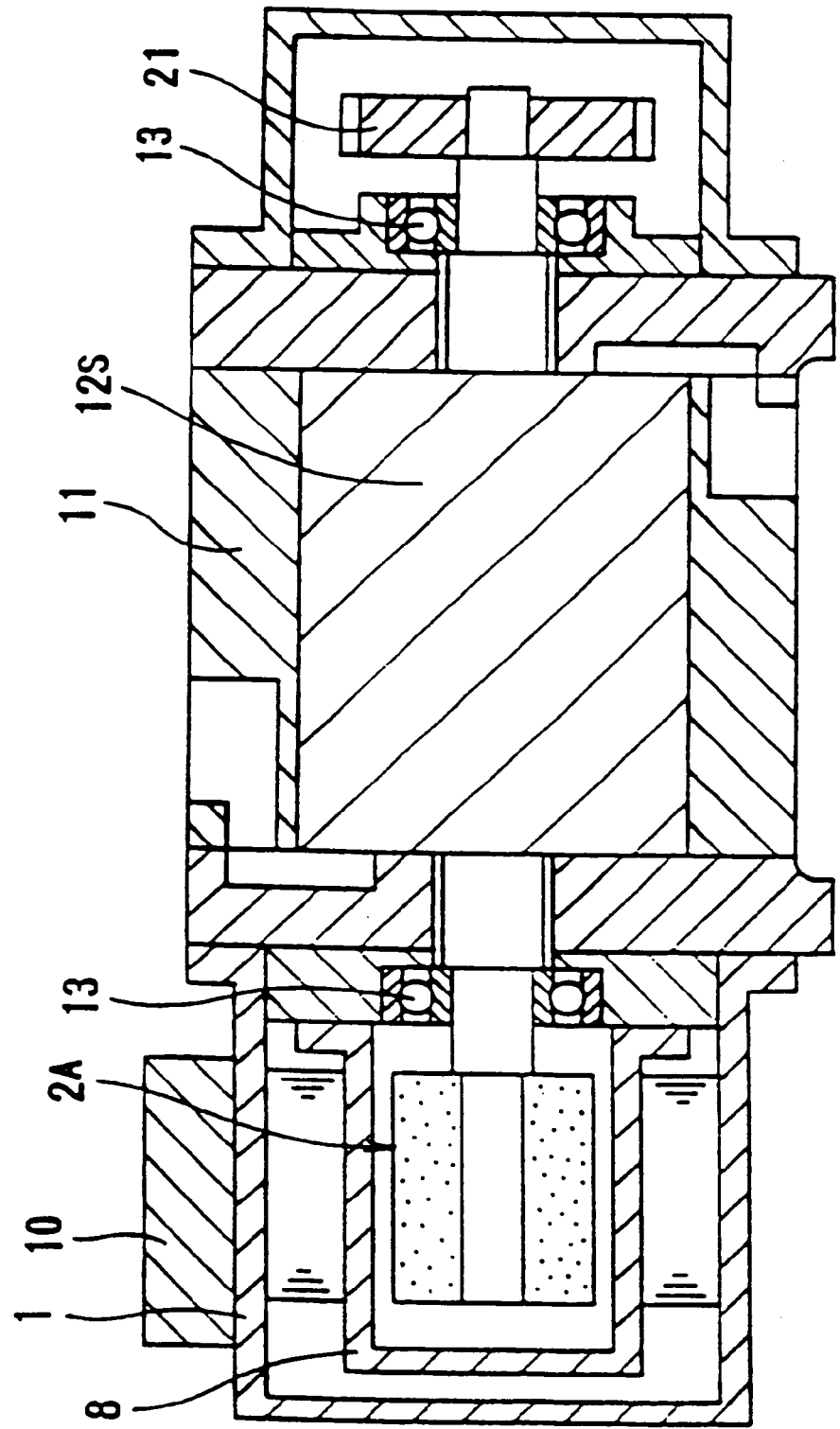
FIG. 22 is an axial cross-sectional view of a positive-displacement vacuum pump according to another embodiment of the present invention.
Figure 23:
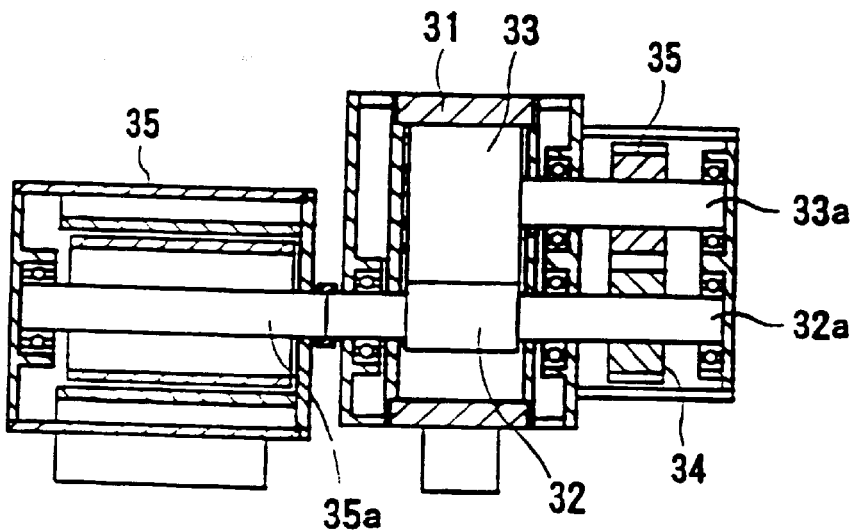
FIG. 23 is an axial cross-sectional view of a conventional two-shaft rotary machine.
Figure 24:
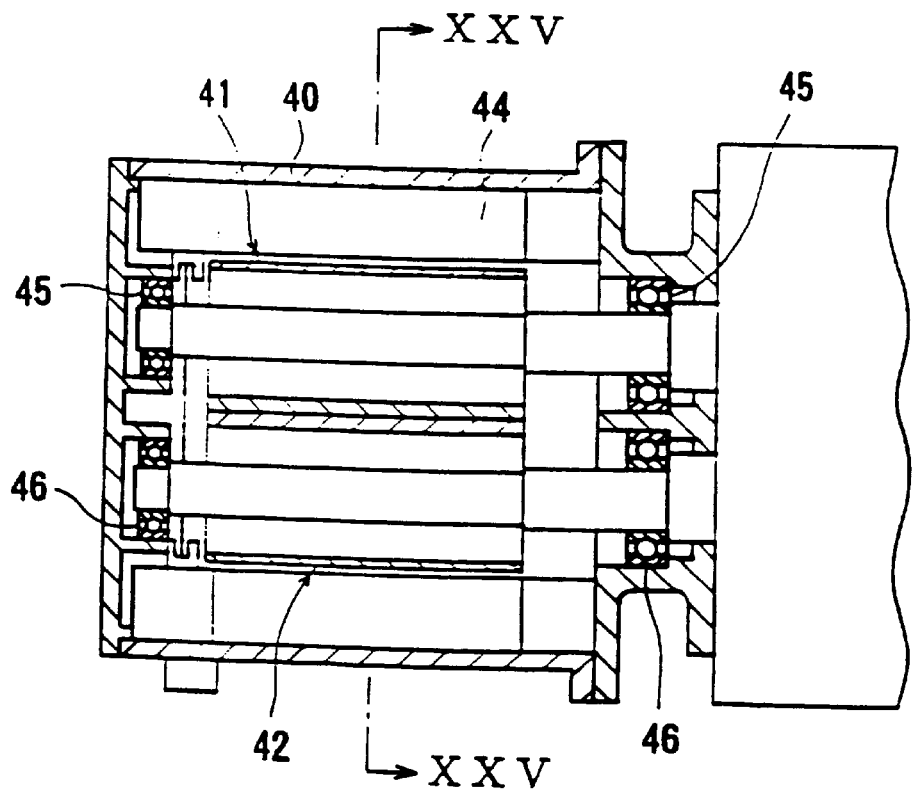
FIG. 24 is an axial cross-sectional view of a conventional two-shaft electric motor.
Figure 25:
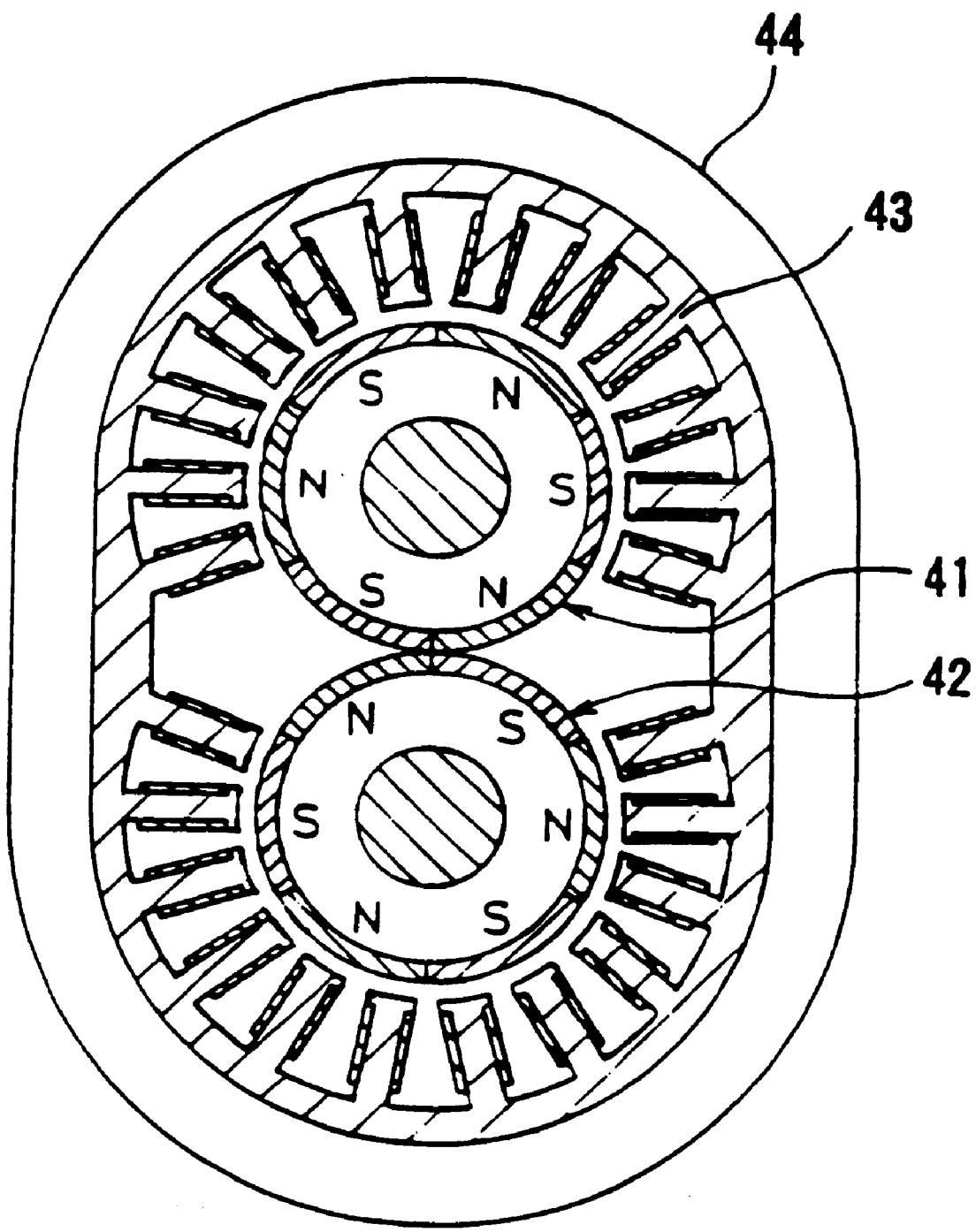
FIG. 25 is a cross-sectional view taken along line XXV—XXV of FIG. 24.

FIG. 22 shows a positive-displacement vacuum pump according to another embodiment of the present invention. In the embodiment shown in FIG. 22, the principles of the present invention are applied to a screw-type vacuum pump. Specifically, a pair of screw rotors 12S (only one shown in FIG. 22) is disposed in a casing 11 and rotatably supported therein by bearings 13. The screw rotors 12S are operatively coupled to each other by intermeshing gears 21 (only one shown in FIG. 22). The screw rotors 12S can be rotated by a two-shaft brushless direct-current motor M which is identical to the two-shaft brushless direct-current motor M according to the embodiment shown in FIG. 15. The positive-displacement vacuum pump shown in FIG. 22 offers the same advantages as those of the positive-displacement vacuum pump shown in FIGS. 15 through 21.

The multishaft electric motor according to the present invention offers the following advantages. The multishaft electric motor can rotate a plurality of shafts synchronously with each other through a magnetic coupling. Since the bearings on the shafts are not subject to an excessive eccentric load, but a radially balanced load, the shafts can be rotated in synchronism with each other stably at high speeds, and the multishaft electric motor has a long service life. Furthermore, the magnetic coupling has a large area, and large synchronizing forces free of pulsating forces are produced to rotate the shafts synchronously because a uniform air gap length is achieved fully around the rotors.

The positive-displacement vacuum pump according to the present invention offers the following advantages.

(1) By supplying a signal to the motor driver for the brushless direct-current motor, the rotational speed of the positive-displacement vacuum pump can be varied to control the displacement of the pump. Heretofore, it has been customary to use another component such as a valve to adjust the rate of flow of a gas discharged from the pump. According to the present invention, such another component is no necessary. Furthermore, an inverter for controlling the rotational speed of the motor is not required, and the brushless direct-current motor is not stopped upon an instantaneous power failure and hence can operate the positive-displacement vacuum pump continuously.

(2) When the rotational speed of the positive-displacement vacuum pump is lowered, it is possible to reduce the load on the positive-displacement vacuum pump thereby preventing the positive-displacement vacuum pump from being overloaded. Such an overload prevention capability is effective for pumps with limited operation ranges. Particularly, a mechanical booster pump which imposes a certain range on the outlet port pressure can heretofore be operated under pressures lower than a certain pressure. According to the present invention, such a mechanical booster pump can be operated simultaneously with an auxiliary pump in a range from the atmospheric pressure, and can increase a discharge rate when the inlet pressure is high, e.g., in the vicinity of the atmospheric pressure, for shortening the time required to discharge the gas from a,vacuum chamber.

(3) The electric motor combined with the positive-displacement vacuum pump may comprise a canned motor. Especially where the positive-displacement vacuum pump is incorporated in a semiconductor fabrication apparatus which handles a highly reactive, corrosive fluid, the canned motor is effective in preventing pump components from reacting or being corroded due to atmospheric air leakage along the shafts, and also in increasing the pump performance.

(4) Since the cans of the electric motor are made of nonmetal, e.g., synthetic resin, the cans cause no loss due to an eddy current, resulting in an increase in the motor efficiency. In addition, the running cost of the positive-displacement vacuum pump is lowered.

Although certain preferred embodiments of the present invention has been shown and described in detail, it should be understood that various changes and modifications may be made therein without departing from the scope of the appended claims.

What is claimed is:

1. A positive-displacement vacuum pump comprising:
   a casing;
   a pair of multi-stage pump rotors rotatably disposed in said casing in confronting relation to each other;
   an electric motor provided for rotating said pump rotors in opposite directions, said electric motor comprising a brushless direct-current motor mounted on said casing of a pump suction side of said casing;
   a pair of timing gears mounted on ends of said pump rotors at a side of said casing which is opposite said electric motor; and
   a controller configured to control said electric motor to rotate at variable speeds for varying a pump displacement.

2. A positive-displacement vacuum pump according to claim 1, wherein said controller monitors and controls a current supplied to said electric motor to vary a rotational speed of said electric motor for preventing a pump overload.

3. A positive-displacement vacuum pump according to claim 1, wherein said electric motor comprises a canned motor having a can housing a motor rotor to isolate said pump rotors from armature elements.

4. A positive-displacement vacuum pump according to claim 1, wherein said pair of multi-stage pump rotors comprises Roots rotors.

* * * * *